(12) United States Patent
Lee et al.

(10) Patent No.: US 10,721,433 B2
(45) Date of Patent: *Jul. 21, 2020

(54) REMOTE CONTROLLER, DISPLAY APPARATUS AND CONTROLLING METHOD THEREOF

(71) Applicant: SAMSUNG ELECTRONICS CO., LTD., Suwon-si, Gyeonggi-do (KR)

(72) Inventors: Won-jae Lee, Seoul (KR); Jong-jin Park, Suwon-si (KR); Min-sup Kim, Suwon-si (KR); Hyun-kyu Yun, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 2 days.

This patent is subject to a terminal disclaimer.

(21) Appl. No.: 15/796,973

(22) Filed: Oct. 30, 2017

(65) Prior Publication Data

US 2018/0146156 A1 May 24, 2018

(30) Foreign Application Priority Data

Nov. 24, 2016 (KR) ........................ 10-2016-0157553

(51) Int. Cl.
*H04N 5/63* (2006.01)
*H04N 5/60* (2006.01)
(Continued)

(52) U.S. Cl.
CPC ............... *H04N 5/63* (2013.01); *G08C 17/00* (2013.01); *H04N 5/4403* (2013.01); *H04N 5/60* (2013.01);
(Continued)

(58) Field of Classification Search
CPC ........ H04N 5/63; H04N 5/642; H04N 5/4403; H04N 5/60; H04N 2005/4426; H04N 2005/4428; H04R 29/00
(Continued)

(56) References Cited

U.S. PATENT DOCUMENTS

| 5,386,478 A | 1/1995 | Plunkett |
| 5,815,631 A | 9/1998 | Sugiyama et al. |

(Continued)

FOREIGN PATENT DOCUMENTS

| EP | 1 947 843 | 7/2008 |
| EP | 2 975 589 | 1/2016 |

(Continued)

*Primary Examiner* — Jefferey F Harold
*Assistant Examiner* — Omer Khalid
(74) *Attorney, Agent, or Firm* — Nixon & Vanderhye P.C.

(57) ABSTRACT

A remote controller is provided. The remote controller includes a transmitter; a microphone configured to receive an audio signal output from an audio output apparatus; a communicator comprising communication circuitry configured to perform communication with a display apparatus connected to the audio output apparatus and to transmit the audio signal received through the microphone to the display apparatus; and a processor configured to control the transmitter to transmit to the audio output apparatus a signal for controlling a power of the audio output apparatus based on information indicating whether there is a test tone in an audio signal received by the microphone and received from the display apparatus.

20 Claims, 10 Drawing Sheets

(51) Int. Cl.
*H04N 5/44* (2011.01)
*H04R 29/00* (2006.01)
*H04N 5/64* (2006.01)
*G08C 17/00* (2006.01)
*H04N 21/422* (2011.01)
*G08C 23/02* (2006.01)
*H04N 21/436* (2011.01)
*H04N 21/443* (2011.01)

(52) U.S. Cl.
CPC ....... *H04N 5/642* (2013.01); *H04N 21/42222* (2013.01); *H04R 29/00* (2013.01); *G08C 23/02* (2013.01); *G08C 2201/12* (2013.01); *G08C 2201/51* (2013.01); *H04N 21/4221* (2013.01); *H04N 21/43615* (2013.01); *H04N 21/4436* (2013.01); *H04N 2005/4426* (2013.01); *H04N 2005/4428* (2013.01); *H04R 2225/61* (2013.01); *H04R 2430/01* (2013.01); *H04R 2460/03* (2013.01)

(58) Field of Classification Search
USPC .................................. 348/734, 730; 345/156
See application file for complete search history.

(56) References Cited

U.S. PATENT DOCUMENTS

| | | | |
|---|---|---|---|
| 8,620,133 | B2 | 12/2013 | Fujita et al. |
| 2009/0081948 | A1* | 3/2009 | Banks ...................... H04R 5/02 455/3.05 |
| 2012/0215537 | A1* | 8/2012 | Igarashi .................. G06F 3/167 704/249 |
| 2014/0092004 | A1* | 4/2014 | Mishra .................. G06F 1/1698 345/156 |
| 2014/0191949 | A1* | 7/2014 | Park ...................... H04N 21/472 345/156 |
| 2016/0119573 | A1* | 4/2016 | Yoon ........................ H03G 3/20 348/738 |

FOREIGN PATENT DOCUMENTS

| | | |
|---|---|---|
| EP | 3 029 650 | 6/2016 |
| JP | 08-45255 | 2/1996 |
| JP | 2008-053814 | 3/2008 |
| JP | 2011-199693 | 10/2011 |
| JP | 2015-177458 | 10/2015 |
| KR | 10-1999-0027028 | 4/1999 |

\* cited by examiner

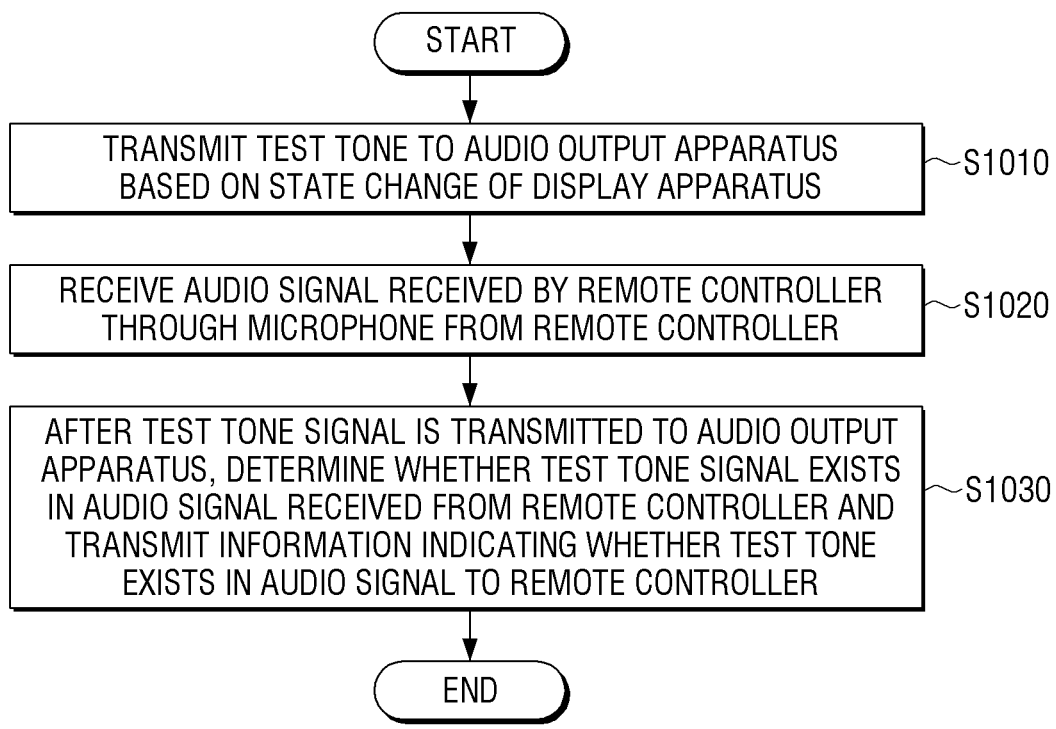

REMOTE CONTROLLER, DISPLAY APPARATUS AND CONTROLLING METHOD THEREOF

CROSS-REFERENCE TO RELATED APPLICATION

This application is based on and claims priority under 35 U.S.C. § 119 to Korean Patent Application No. 10-2016-0157553, filed on Nov. 24, 2016 in the Korean Intellectual Property Office the disclosure of which is incorporated by reference herein in its entirety.

BACKGROUND

Field

The present disclosure relates generally to a remote controller, a display apparatus, and a controlling method thereof, and for example, to a remote controller for controlling a display apparatus, a display apparatus connected to an audio output apparatus, and a controlling method thereof.

Description of Related Art

Recently, with the development of electronic technology, many electronic devices are installed in the home and other electronic devices connected to one electronic device have been often used.

For example, a user has used a speaker connected to a TV to get better sound quality.

In this case, however, since a user must individually operate power supplies for each electronic device, it is required to search for a controlling method of a power of other electronic devices connected to the electronic device by an easier method.

SUMMARY

Example embodiments of the present disclosure address the above disadvantages and other disadvantages not described above.

The present disclosure provides a remote controller, a display apparatus, and a controlling method thereof capable of automatically controlling an audio output apparatus based on whether a test tone signal is output from the audio output apparatus based on a change in a state of a display apparatus.

According to an example aspect of the present disclosure, a remote controller includes: a transmitter; a microphone configured to receive an audio signal output from an audio output apparatus; a communicator comprising communication circuitry configured to perform communication with a display apparatus connected to the audio output apparatus to transmit the audio signal received through the microphone to the display apparatus; and a processor configured to, if information indicating whether there is a test tone in an audio signal received by the microphone is received from the display apparatus, control the transmitter to transmit to the audio output apparatus a signal for controlling a power of the audio output apparatus based on the information.

The processor may transmit a mute signal to the audio output apparatus if it is determined that the test tone exists in the audio signal received by the microphone based on the information received from the display apparatus.

The processor may transmit the audio signal received by the microphone to the display apparatus after transmitting the mute signal, and transmit the signal for turning off the power of the audio output apparatus to the audio output apparatus if the information indicating that the test tone does not exist in the audio signal received by the microphone is received from the display apparatus.

The processor may transmit a signal to the audio output apparatus for turning off the power of the audio output apparatus if it is determined that the test tone exists in the audio signal received by the microphone based on the information received from the display apparatus.

The processor may transmit a signal to the audio output apparatus for turning on the power of the audio output apparatus if it is determined that the test tone does not exist in the audio signal received by the microphone based on the information received from the display apparatus.

According to another example aspect of the present disclosure, a display apparatus includes: an interface comprising circuitry configured to be connected to an audio output apparatus and to transmit a test tone to the audio output apparatus based on a state change of the display apparatus; a communicator comprising communication circuitry configured to perform communication with a remote controller including a microphone configured to receive an audio signal received by the remote controller through the microphone from the remote controller; and a processor configured to control the communicator to determine whether a test tone exists in the audio signal received from the remote controller after the test tone is transmitted to the audio output apparatus and to transmit information indicating whether there is the test tone in the audio signal to the remote controller.

The processor may stop transmitting the audio signal to the audio output apparatus and transmit the test tone to the audio output apparatus, if an audio output switching command for outputting the audio signal from other devices is input while the audio signal is transmitted to the audio output apparatus.

The processor may determine whether there is the test tone in the audio signal received from the remote controller and transmit information indicating whether there is the test tone in the audio signal to the remote controller, after transmitting information indicating whether there is the test tone in the audio signal to the remote controller.

The processor may turn off a power of the display apparatus and transmit the test tone to the audio output apparatus, if a power-off command for turning off a power of the display apparatus is input while the audio signal is transmitted to the audio output apparatus.

The processor may turn on the power of the display apparatus and transmit the test tone to the audio output apparatus, if the power-on command for turning on the power of the display apparatus is input.

According to still another example aspect of the present disclosure, a method of controlling a remote controller includes: receiving an audio signal output from an audio output apparatus; transmitting an audio signal received through a microphone to a display apparatus; and transmitting to the audio output apparatus a signal for controlling a power of the audio output apparatus based on information if the information indicating whether there is a test tone in an audio signal received by the microphone is received from the display apparatus.

The method may further include: transmitting a mute signal to the audio output apparatus if it is determined that the test tone exists in the audio signal received by the microphone based on the information received from the display apparatus.

The method may further include: transmitting the audio signal received by the microphone to the display apparatus, after the transmitting of the mute signal, wherein in the transmitting, if the information indicating that the test tone does not exist in the audio signal received by the microphone is received from the display apparatus, a signal for turning off the power of the audio output apparatus may be transmitted to the audio output apparatus.

In the transmitting, if it is determined that the test tone exists in the audio signal received by the microphone based on the information received from the display apparatus, a signal for turning off the power of the audio output apparatus may be transmitted to the audio output apparatus.

In the transmitting, if it is determined that the test tone does not exist in the audio signal received by the microphone based on the information received from the display apparatus, a signal for turning on the power of the audio output apparatus may be transmitted to the audio output apparatus.

According to yet another example aspect of the present disclosure, a method of controlling a display apparatus includes: transmitting a test tone to the audio output apparatus based on a state change of the display apparatus; receiving an audio signal received by a remote controller through a microphone from the remote controller; and determining whether a test tone exists in the audio signal received from the remote controller after the test tone is transmitted to the audio output apparatus and transmitting information indicating whether there is the test tone in the audio signal to the remote controller.

In the transmitting of the information to the audio output apparatus, the transmission of the audio signal to the audio output apparatus may stop and the test tone may be transmitted to the audio output apparatus, if an audio output switching command for outputting the audio signal from other devices is input while the audio signal is transmitted to the audio output apparatus.

The method may further include determining whether there is the test tone in the audio signal received from the remote controller and transmitting information indicating whether there is the test tone in the audio signal to the remote controller, after the transmitting of the information indicating whether there is the test tone in the audio signal to the remote controller.

In the transmitting of the information to the audio output apparatus, a power of the display apparatus may be turned off and the test tone may be transmitted to the audio output apparatus, if a power-off command for turning off a power of the display apparatus is input while the audio signal is transmitted to the audio output apparatus.

In the transmitting of the information to the audio output apparatus, the power of the display apparatus may be turned on and the test tone may be transmitted to the audio output apparatus, if the a power-on command for turning on the power of the display apparatus is input.

As described above, according to various example embodiments of the present disclosure, it is possible to automatically control the power of the audio output apparatus based on whether the audio output apparatus outputs the test tone signal provided from the display apparatus to increase the user convenience.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIG. 10 is a flowchart illustrating an example method of controlling a display apparatus according to an example embodiment of the present disclosure.

DETAILED DESCRIPTION

Herein, various example embodiments of the present disclosure will be described in greater detail. Terms used herein are for description and are not to be understood as limiting the present disclosure. The present disclosure may be variously modified and changed according to the contents. Therefore, unless additionally mentioned, the present disclosure may be freely practiced within the scope of claims and their equivalents.

Hereinafter, various example embodiments of the present disclosure will be described in greater detail with reference to the accompanying drawings.

Figure 1:
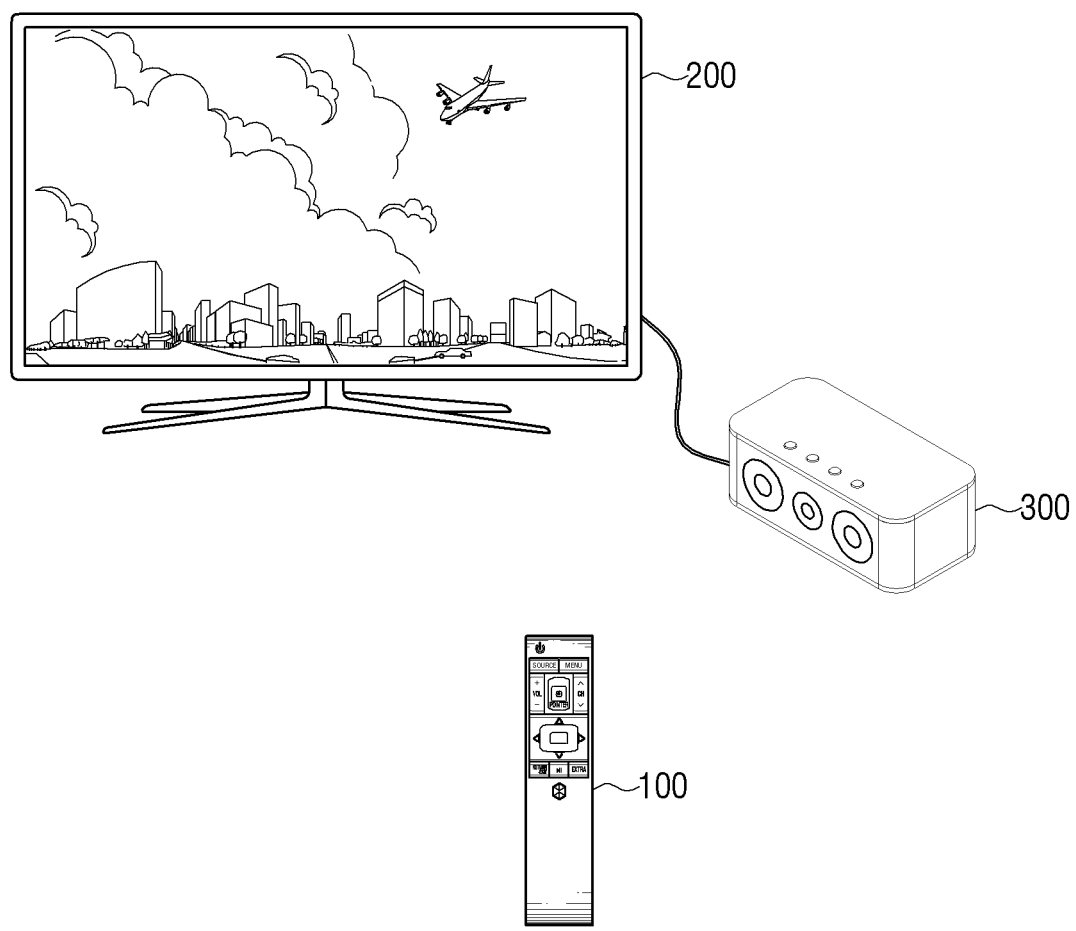
FIG. 1 is a diagram illustrating an example audio system according to an example embodiment of the present disclosure.

FIG. 1 is a diagram illustrating an example audio system according to an example embodiment of the present disclosure.

Referring to FIG. 1, an audio system 1000 includes a remote controller 100, a display apparatus 200, and an audio output apparatus 300.

The remote controller 100 may, for example, and without limitation, be implemented as a remote control and may control the audio output apparatus 300. For example, the remote controller 100 can turn on or off the audio output apparatus 300 based on a code set capable of controlling the audio output apparatus 300.

Also, the remote controller 100 may communicate with the display apparatus 200 to transmit/receive various data to/from the display apparatus 200. For example, and without limitation, the remote controller 100 may communicate with the display apparatus 200 according to a Bluetooth scheme, or the like.

The display apparatus 200 may be connected to the audio output apparatus 300. For example, the display apparatus 200 and the audio output apparatus 300 may, for example, and without limitation, be connected to each other through an optical cable, an RCA cable, an AUX cable, or the like.

Accordingly, the display apparatus 200 may transmit an audio signal to the audio output apparatus 300, and the audio output apparatus 300 may output the audio signal received from the display apparatus 200.

For example, the display apparatus 200 may output a video signal for content such as a broadcast program through a display, and transmit an audio signal for the corresponding content to the audio output apparatus 300 to output the audio for the content through the audio output apparatus 300.

The display apparatus 200 performing such a function may, for example, and without limitation, be implemented as a TV, and the audio output apparatus 300 may, for example, and without limitation, be implemented as a speaker. However, it should be noted that this is only an example and the display apparatus 200 and the audio output apparatus 300 may be implemented as various types of apparatuses capable of transmitting an audio signal and outputting the received audio signal.

On the other hand, the remote controller 100 may automatically turn on or off the power of the audio output apparatus 300 based on a state of the display apparatus 200.

For example, while the display apparatus 200 is transmitting the audio signal to the audio output apparatus 300 and the audio output apparatus 300 outputs the audio signal received from the display apparatus 200, the display apparatus 200 may output the audio signal through other devices, for example, a speaker provided in the display apparatus 200 or another audio output apparatus connected to the display apparatus 200. Moreover, the remote controller 100 may turn off the power of the audio output apparatus 300 if the power of the display apparatus 200 is turned off.

As another example, if it is determined that the power of the display apparatus 200 is turned on and an output source is set as the audio output apparatus 300, the remote controller 100 may turn on the power of the audio output apparatus 300.

In this way, according to various example embodiments of the present disclosure, even if there is no separate user command for controlling the power of the audio output apparatus 300, the user convenience may be improved in that the power of the audio output apparatus 300 is controlled based on the state of the display apparatus 200.

Figure 2:
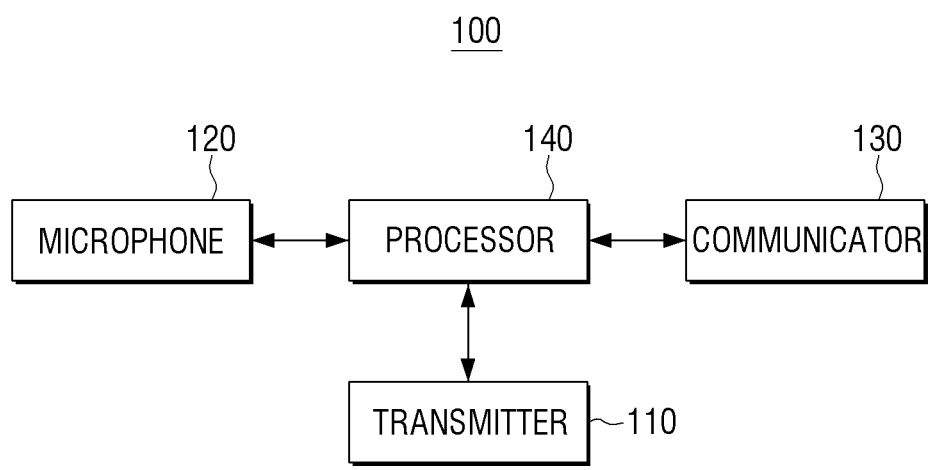
FIG. 2 is a block diagram illustrating an example configuration of a remote controller according to an example embodiment of the present disclosure.

FIG. 2 is a block diagram illustrating an example configuration of a remote controller according to an example embodiment of the present disclosure.

Referring to FIG. 2, the remote controller 100 is configured to include a transmitter 110, a microphone 120, a communicator (e.g., including communication circuitry) 130, and a processor (e.g., including processing circuitry) 140.

The transmitter 110 transmits a control signal to the audio output apparatus 300. For example, the transmitter 110 may transmit the control signal (e.g., optical signal) generated based on the code set to the audio output apparatus 300 in, for example, and without limitation, an IR scheme, or the like.

For example, the transmitter 110 may transmit a control signal, including a custom code corresponding to a maker or a device type of the audio output apparatus 300 and a key code indicating a control command (e.g., power on, power off, mute, or the like) for controlling an operation of the audio output apparatus 300, to the audio output apparatus 300. In this case, the control signal may be modulated into a carrier wave and output. To this end, the transmitter 110 may, for example, and without limitation, include an infrared-laser emitting diode (IR-LED), or the like.

The microphone 120 receives the audio signal. For example, the microphone 120 may collect an audio signal generated around the remote controller 100. For example, the microphone 120 may receive an audio signal output from the audio output apparatus 300.

The communicator 130 may include various communication circuitry and performs communication with the display apparatus 200. For example, the communicator 130 may include various communication circuitry, such as, for example, and without limitation, a chip or the like for performing Bluetooth communication, and may perform communication with the display apparatus 200 according to a Bluetooth communication scheme, or the like. However, it should be noted that this is only an example, and the communicator 130 may perform communication with the display apparatus 200 in various ways.

The processor 140 may include various processing circuitry and controls the overall operation of the remote controller 100.

The processor 140 may control the communicator 130 to perform communication with the display apparatus 200. For example, the processor 140 may control the communicator 130 to be connected to the display apparatus 200 according to the Bluetooth communication scheme.

In addition, the processor 140 may receive the audio signal output from the audio output apparatus 300 through the microphone 120.

When receiving the audio signal output from the audio output apparatus 300 through the microphone 120, the processor 140 may control the communicator 130 to transmit the received audio signal to the display apparatus 200.

For example, when the audio signal is output from the audio output apparatus 300, the processor 140 receives the audio signal output from the audio output apparatus 300 through the microphone 120 and may control the communicator 130 to output the received audio signal to the display apparatus 300.

Meanwhile, if receiving, from the display apparatus 200, information indicating whether a test tone (or test tone signal) exists in the audio signal received by the microphone 120, the processor 140 may control the transmitter 110 to transmit a signal for controlling the power of the audio output apparatus 300 to the audio output apparatus 300 based on the received information.

For example, if receiving an audio output switching command for outputting the audio signal from other devices (e.g., a speaker provided in the display apparatus 200 or other audio output apparatus connected to the display apparatus 200) while the display apparatus 200 is transmitting the audio signal to the audio output apparatus 300, the display apparatus 200 may stop transmitting the audio signal to the audio output apparatus 300, transmit the test tone to the audio output apparatus 300, and transmit the audio signal to the other devices.

Accordingly, the audio output apparatus 300, which outputs the audio signal received from the display apparatus 200 in the power-on state, may stop the output of the audio signal and output the test tone. In this case, the other devices may output the audio signal received from the display apparatus 200.

For example, it is assumed that while the display apparatus 200 is transmitting an audio signal for content to the audio output apparatus 300, the audio output switching command for outputting the audio signal for the content through the speaker provided in the display apparatus 200 or another audio output apparatus connected to the display apparatus 200 is input to the display apparatus 200.

In this case, the display apparatus 200 stops transmitting the audio signal for the content to the audio output apparatus 300 and transmits the audio signal for the content through the speaker provided in the display apparatus 200 or through another audio output apparatus connected to the display apparatus 200.

In other words, the display apparatus 200 may no longer output the audio signal for the content to the audio output apparatus 300, but output the audio signal for the content through the speaker provided in the display apparatus 200 or transmit the audio signal for the content to another audio output apparatus connected to the display apparatus 200.

The display apparatus 200 can transmit the test tone to the audio output apparatus 300. Accordingly, the audio output apparatus 300 may stop the output of the audio signal for the content and output the test tone.

On the other hand, the test tone may be an audio signal having a frequency band of an audible region, and may have the same or similar audio characteristics as or to those of the audio signals output from the other devices.

For example, the display apparatus 200 may analyze the audio signals transmitted to other devices to determine intensity of signals for each frequency and output a signal having the same or similar intensity for at least one frequency as the test tone.

In this case, the user hears the test tone together with the audio signals for the content output from the other devices. Therefore, since the user does not easily recognize the test tone due to the audio characteristics of the test tone, it is possible to reduce interference with watching content.

However, it should be noted that this is only an example and the test tone signal may be implemented in various ways.

For example, the display apparatus 200 may output the audio signal of a specific size having a predetermined time difference at a specific frequency as the test tone, output the audio signal having the specific size at the specific frequency as the test tone, or output a first audio signal having a specific size at a specific frequency and a second audio signal having a different magnitude at a frequency different from the first signal as the test tone.

On the other hand, the above-described example describes that the display apparatus 200 transmits the test tone to the audio output apparatus 300, and the audio output apparatus 300 outputs the test tone received from the display apparatus 200.

However, this is only an example, and the audio output apparatus 300 may output the test tone even if the display apparatus 200 does not transmit the test tone to the audio output apparatus 300. For example, the audio output apparatus 300 may receive the audio signal from the display apparatus 200 and output the test tone if the audio signal is no longer received from the display apparatus 200.

Meanwhile, the processor 140 may receive the audio signal output from the audio output apparatus 300 through the microphone 120, and transmit the received audio signal to the display apparatus 200 through the communicator 130.

For example, the audio output apparatus 300 stops the transmission of the audio signal for the content according to the audio output switching command, in which the test tone may be included in the audio signal received through the microphone 120 in that the audio output apparatus 300 outputs the test tone. Consequently, the processor 140 may transmit the audio signal including the test tone to the display apparatus 200.

Meanwhile, if the audio signal received by the remote controller 100 through the microphone 120 is received after the display apparatus 200 transmits the test tone, the display apparatus 200 may determine whether or not the test tone exists in the received audio signal and transmit the information indicating whether there is the test tone to the remote controller 100.

For example, if the test tone is detected from the audio signal received from the remote controller 100, the display apparatus 200 may determine that a test tone exists in the received audio signal, and transmit the information indicating that the test tone exists to the remote controller 100. However, if the test tone is not detected from the audio signal received from the remote controller 100, the display apparatus 200 may determine that the test tone does not exist in the received audio signal, and transmit the information indicating that no test tone exists to the remote controller 100.

Here, since the test tone is output from the audio output apparatus 300, the determination on whether there is the test tone in the audio signal received by the display apparatus 200 may be considered as a determination of whether the audio output apparatus 300 outputs the test tone.

In other words, if the audio signal received by the remote controller 100 through the microphone 120 is received after the display apparatus 200 transmits the test tone, the display apparatus 200 may determine whether or not the test tone exists in the received audio signal to determine whether the audio output apparatus 300 outputs the test tone and transmit the information indicating whether the audio output apparatus 300 outputs the test tone to the remote controller 100.

Meanwhile, the processor 140 may transmit a mute signal to the audio output apparatus 300 if it is determined that the test tone exists in the audio signal received by the microphone 120 based on the information received from the display apparatus 200.

That is, if the information indicating that the test tone exists is received from the display apparatus 200 through the communicator 130, the processor 140 determines that the audio output apparatus 300 may output the test tone in the power-on state and transmit the mute signal to the audio output apparatus 300 through the transmitter 110.

In this case, the audio output apparatus 300 may stop the output of the test tone based on the mute signal received from the remote controller 100.

The processor 140 may transmit the audio signal received through the microphone 120 to the display apparatus 200 after transmitting the mute signal. In this case, the display apparatus 200 may determine whether or not the test tone exists in the audio signal received from the remote controller 100.

The audio output apparatus 300 stops the output of the test tone based on the mute signal, so that the audio signal received by the microphone 120 has no test tone.

Accordingly, if the test tone does not exist in the audio signal received from the remote controller 100, the display apparatus 200 may determine that the test tone does not exist in the audio signal received by the remote controller 100 through the microphone 120 and transmit the information indicating that the test tone does not exist in the audio signal to the remote controller 100.

Meanwhile, if the information indicating that the test tone does not exist in the audio signal received by the microphone 120 is received from the display apparatus 200, the processor 140 may transmit the signal for turning off the power of the audio output apparatus 300 to the audio output apparatus 300.

As described above, since the audio output apparatus 300 stops the output of the test tone based on the mute signal, the display apparatus 200 may transmit the information indicating that the test tone signal does not exist in the audio signal received from the remote controller 100 to the remote controller 100.

Accordingly, if the information indicating that the test tone does not exist in the audio signal is received from the display apparatus 200, the processor 140 may control the transmitter 110 to generate a signal for turning off the power of the audio output apparatus 300 and transmit the generated signal to the audio output apparatus 300.

However, the above-mentioned example describes that the remote controller 100 transmits the signal for turning off the power to the audio output apparatus 300 after transmitting the mute signal to the audio output apparatus 300, which is only an example. If the information indicating that the test tone exists is received from the display apparatus 200, the processor 140 may determine that the power of the audio output apparatus 300 is turned on to transmit the signal for turning off the power of the audio output apparatus 300 to the audio output apparatus 300 without transmitting the mute signal to the audio output apparatus 300.

Further, the above-described example describes that the display apparatus 200 determines whether there is the test tone in the audio signal, which is only an example. For example, if the information on the test tone is pre-stored in the remote controller 100, the processor 140 does not transmit the audio signal received through the microphone 120 to the display apparatus 200 but determines whether there is the test tone in the audio signal received through the microphone 120, determines that the power of the audio output apparatus 300 is turned on if the test tone exists, and turn off the power of the audio output apparatus 300.

As described above, according to an example embodiment of the present disclosure, if the audio output switching command is input to the display apparatus 200 that has transmitted the audio signal to the audio output apparatus 300, the remote controller 100 may turn off the power of the audio output apparatus 300.

In other words, outputting the test tone by the audio output apparatus 300 may refer to a situation in which the user who has used the audio output apparatus 300 no longer intends to use the audio output apparatus 300 such as wanting to receive the audio signal through other devices, and therefore the remote controller 100 may turn off the power of the audio output apparatus 300 if the test tone is output through the audio output apparatus 300.

Meanwhile, according to an example embodiment of the present disclosure, even when the audio output switching command is input to the display apparatus 200 that has transmitted the audio signal to the audio output apparatus 300, the remote controller 100 may automatically turn off the power of the audio output apparatus 300, which will be described in greater detail below.

For example, if the power-off command for turning off the power of the display apparatus 200 is input while the display apparatus 200 is transmitting the audio signal to the audio output apparatus 300, the remote controller 100 may turn off the power of the display apparatus 200 and transmit the test tone to the audio output apparatus 300.

The display apparatus 200 may transmit the test tone to the audio output apparatus 300 together with audio signals (e.g., a specific sound effect) indicating that the power-off command has been input. However, the display apparatus 200 can transmit only the test tone to the audio output apparatus 300.

That is, the display apparatus 200 turns off the power in response to the power-off command, and may stop outputting the audio signal before the power is turned off and transmit the test tone to the audio output apparatus 300 together with the audio signal indicating that the power-off command is input. Accordingly, the audio output apparatus 300, which outputs the audio signal received from the display apparatus 200 in the power-on state, may stop outputting the audio signal that is output and output the audio signal indicating that the power-off command is input and the test tone.

For example, it is assumed that while the display apparatus 200 is transmitting the audio signal for the content to the audio output apparatus 300, the power-off command for turning off the power of the display apparatus 200 is input to the display apparatus 200.

In this case, the display apparatus 200 may transmit to the audio output apparatus 300 the audio signal indicating that the power-off command has been input and the test tone, before the power is turned off. Accordingly, the audio output apparatus 300 may stop outputting the audio signal for the content and output the audio signal indicating that the power-off command is input and the test tone.

On the other hand, the test tone may be an audio signal having a frequency band of an audible region, and may have the same or similar audio characteristics as or to those of the audio signal indicating that the power-off command is input.

For example, the display apparatus 200 may analyze the audio signal indicating that the power-off command is input to determine intensity of signals for each frequency and output a signal having the same or similar intensity for at least one frequency as a test tone.

In this case, the user hears the test tone together with the audio signal indicating that a power-off command has been input, and therefore does not easily recognize the test tone due to the audio characteristics of the audio signal and the test tone.

However, it should be noted that this is only an example and the test tone signal may be implemented in various ways.

For example, the display apparatus 200 may output the audio signal of a specific size having a predetermined time difference at a specific frequency as the test tone, output the audio signal having the specific size at the specific frequency as the test tone, or output a first audio signal having a specific size at a specific frequency and a second audio signal having a different magnitude at a frequency different from the first signal as the test tone.

On the other hand, the above-described example describes that the display apparatus 200 transmits the test tone to the audio output apparatus 300, and the audio output apparatus 300 outputs the test tone received from the display apparatus 200.

However, this is only an example, and the audio output apparatus 300 may output the test tone even if the display apparatus 200 does not transmit the test tone to the audio output apparatus 300. For example, the audio output apparatus 300 may receive the audio signal from the display apparatus 200 and output the test tone if the audio signal is no longer received from the display apparatus 200.

Meanwhile, the processor 140 may receive the audio signal output from the audio output apparatus 300 through the microphone 120, and transmit the received audio signal to the display apparatus 200 through the communicator 130.

That is, since the audio output apparatus 300 stops outputting the audio signal for the content in response to the power-off command and outputs the audio signal indicating that the power-off command is input and the test tone, the audio signal indicating that the power-off command has been input and the test tone may be included in the audio signal. Consequently, the processor 140 may transmit the audio signal including the test tone to the display apparatus 200.

Meanwhile, if the audio signal received by the remote controller 100 through the microphone 120 is received after the display apparatus 200 transmits the test tone, the display apparatus 200 may determine whether or not the test tone exists in the received audio signal and transmit the information indicating whether there is the test tone to the remote controller 100.

For example, if the test tone is detected from the audio signal received from the remote controller 100, the display apparatus 200 may determine that a test tone exists in the received audio signal, and transmit the information indicating that the test tone exists to the remote controller 100. However, if the test tone is not detected from the audio signal received from the remote controller 100, the display apparatus 200 may determine that the test tone does not exist in the received audio signal, and transmit the information indicating that no test tone exists to the remote controller 100.

Here, since the test tone is output from the audio output apparatus 300, the determination of whether there is the test tone in the audio signal received by the display apparatus 200 may be considered as the determination on whether the audio output apparatus 300 outputs the test tone.

That is, if the remote controller 100 receives the audio signal received through the microphone 120 after transmitting the test tone, the display apparatus 200 may determine whether or not the test tone exists in the received audio signal to determine whether the audio output apparatus 300 outputs the test tone and transmit the information indicating whether the audio output apparatus 300 outputs the test tone to the remote controller 100.

To this end, the display apparatus 200 may activate a component for performing the above-described operation for a preset time even if the power-off command is input. Accordingly, even if the power-off command is input, the display apparatus 200 may determine whether there is the test tone in the audio signal received by the remote controller 100 through the microphone 120 and transmit the information on the determination to the remote controller 100.

Meanwhile, the processor 140 may transmit the signal for turning off the power of the audio output apparatus 300 to the audio output apparatus 300 if it is determined that the test tone exists in the audio signal received by the microphone 120 based on the information received from the display apparatus 200.

That is, if the information indicating that the test tone exists in the audio signal received by the microphone 120 through the communicator 130 is received from the display apparatus 200, the processor 140 determines that the power of the audio output apparatus 300 is in the turned-on state and may control the transmitter 110 to generate the signal for turning off the power of the audio output apparatus 300 and transmit the generated signal to the audio output apparatus 300.

Accordingly, the power of the audio output apparatus 300 may turned off based on the signal received from the remote controller 100.

Meanwhile, the above-described example describes that the display apparatus 200 determines whether there is the test tone in the audio signal, which is only an example. That is, if the information on the test tone is pre-stored in the remote controller 100, the processor 140 does not transmit the audio signal received through the microphone 120 to the display apparatus 200 but determines whether there is the test tone in the audio signal received through the microphone 120, determines that the power of the audio output apparatus 300 is turned on if the test tone exists, and turn off the power of the audio output apparatus 300.

As described above, according to an example embodiment of the present disclosure, if the power-off command is input to the display apparatus 200 that has transmitted the audio signal to the audio output apparatus 300, the remote controller 100 may turn off the power of the audio output apparatus 300.

That is, outputting the test tone by the audio output apparatus 300 may refer to a situation in which the user no longer intends to use the audio output apparatus 300 such as turning off the power of the display apparatus 200, and therefore it is preferable to turn off even the power of the audio output apparatus 300 that receives the audio signal from the display apparatus 200 and output the received audio signal. Accordingly, if the test tone is output through the audio output apparatus 300, the remote controller 100 may automatically turn off the power of the audio output apparatus 300.

Meanwhile, according to an example embodiment of the present disclosure, even when the power-on command is input to the display apparatus 200 in which the output source is set as the audio output apparatus 300, the remote controller 100 may automatically turn on the power of the audio output apparatus 300, which will be described in greater detail below.

For example, the display apparatus 200 may turn on the power of the display apparatus 200 if the power-on command for turning on the power of the display apparatus 200 is input. If it is determined that the output source of the display apparatus 200 is set as the audio output apparatus 300, the display apparatus 200 may transmit the test tone to the audio output apparatus 300.

At this time, the display apparatus 200 may transmit the test tone to the audio output apparatus 300 together with audio signals (e.g., a specific sound effect) indicating that the power-on command has been input. However, the display apparatus 200 may transmit only the test tone to the audio output apparatus 300.

In this case, since the power of the audio output apparatus 300 is in the turned-off state, even if the display apparatus 200 transmits the test tone signal, the audio output apparatus 300 may not receive and output the test tone signal.

For example, it is assumed that while all the power supplies for the display apparatus 200 and the audio output apparatus 300 are in the turned-off state, the power-on command for turning on the power of the display apparatus 200 is input to the display apparatus 200.

In this case, if it is determined that the power is turned on and the output source is set as the audio output apparatus 300, the display apparatus 200 may transmit the audio signal indicating that the power-on command is input and the test tone to the audio output apparatus 300. However, since the power of the audio output apparatus 300 is in the powered-off state, the audio output apparatus 300 may not receive and output the audio signal and the test tone signal that the display apparatus 200 transmits.

On the other hand, the test tone may be an audio signal having a frequency band of an audible region, and may have the same or similar audio characteristics as or to those of the audio signal indicating that the power-on command is input.

For example, the display apparatus 200 may analyze the audio signal indicating that the power-on command is input to determine intensity of signals for each frequency and output a signal having the same or similar intensity for at least one frequency as a test tone.

In this case, the user hears the test tone together with the audio signal indicating that a power-on command has been input, and therefore does not easily recognize the test tone due to the audio characteristics of the audio signal and the test tone.

However, it should be noted that this is only an example and the test tone signal may be implemented in various ways.

For example, the display apparatus 200 may output the audio signal of a specific size having a predetermined time difference at a specific frequency as the test tone, output the audio signal having the specific size at the specific frequency as the test tone, or output a first audio signal having a specific size at a specific frequency and a second audio signal having a different magnitude at a frequency different from the first signal as the test tone.

Meanwhile, the processor 140 may receive the audio signal output from the audio output apparatus 300 through the microphone 120, and transmit the received audio signal to the display apparatus 200 through the communicator 130.

That is, since the audio output apparatus 300 may not receive and output an audio signal because the power is in the turned-off state, the audio signal indicating that the power-on command is input and the test tone signal are not included in the audio signal received through the microphone 120. As a result, the audio signal transmitted from the processor 140 to the display apparatus 200 does not include the test tone.

Meanwhile, if the remote controller 100 receives the audio signal received through the microphone 120 after transmitting the test tone, the display apparatus 200 may determine whether or not the test tone exists in the received audio signal and transmit the information indicating whether there is the test tone to the remote controller 100.

Specifically, if the test tone is detected from the audio signal received from the remote controller 100, the display apparatus 200 may determine that a test tone exists in the received audio signal, and may transmit the information indicating that the test tone exists to the remote controller 100. However, if the test tone is not detected from the audio signal received from the remote controller 100, the display apparatus 200 may determine that the test tone does not exist in the received audio signal, and may transmit the information indicating that no test tone exists to the remote controller 100.

Here, since the test tone is output from the audio output apparatus 300, the determination on whether there is the test tone in the audio signal received by the display apparatus 200 may be considered as the determination on whether the audio output apparatus 300 outputs the test tone.

That is, if the remote controller 100 receives the audio signal received through the microphone 120 after transmitting the test tone, the display apparatus 200 may determine whether or not the test tone exists in the received audio signal to determine whether the audio output apparatus 300 outputs the test tone and transmit the information indicating whether the audio output apparatus 300 outputs the test tone to the remote controller 100.

Meanwhile, the processor 140 may transmit the signal for turning on the power of the audio output apparatus 300 to the audio output apparatus 300 if it is determined that the test tone exists in the audio signal received by the microphone 120 based on the information received from the display apparatus 200.

That is, if the information indicating that the test tone does not exist in the audio signal received by the microphone 120 through the communicator 130 is received from the display apparatus 200, the processor 140 determines that the power of the audio output apparatus 300 is in the turned-off state and may control the transmitter 110 to generate the signal for turning on the power of the audio output apparatus 300 and transmit the generated signal to the audio output apparatus 300.

Accordingly, the power of the audio output apparatus 300 may be turned-off based on the signal received from the remote controller 100.

Meanwhile, the above-described example describes that the display apparatus 200 determines whether there is the test tone in the audio signal, which is only an example. That is, if the information on the test tone is pre-stored in the remote controller 100, the processor 140 does not transmit the audio signal received through the microphone 120 to the display apparatus 200 but determines whether the test tone signal exists in the audio signal received through the microphone 120, determines that the power of the audio output apparatus 300 is turned off if the test tone signal does not exist, and turn on the power of the audio output apparatus 300.

As described above, according to an example embodiment of the present disclosure, if the power-on command is input to the display apparatus 200 in which the output source is set as the audio output apparatus 300, the remote controller 100 may turn on the power of the audio output apparatus 300.

That is, since the user may set the output source of the display apparatus 200 as the audio output apparatus 300 for the purpose of using the audio output apparatus 300, it may be preferred that when the power of the display apparatus 200 is turned on, the power of the audio output apparatus 300 is also turned on. Accordingly, if the test tone is output through the audio output apparatus 300, the remote controller 100 indicates that the power of the audio output apparatus 300 is in the turned-off state, and therefore may automatically turn on the power of the audio output apparatus 300.

Meanwhile, the above example describes that the power-on command is input to the display apparatus 200, which is only an example. That is, even if the power of the audio output apparatus is in the turned-off state and the audio output switching command for outputting the audio signal through the audio output apparatus 300 is input to the display apparatus 200 that outputs the audio signal through other devices, the remote controller 100 may turn on the power of the audio output apparatus 300 by the above-mentioned process.

Figure 3:
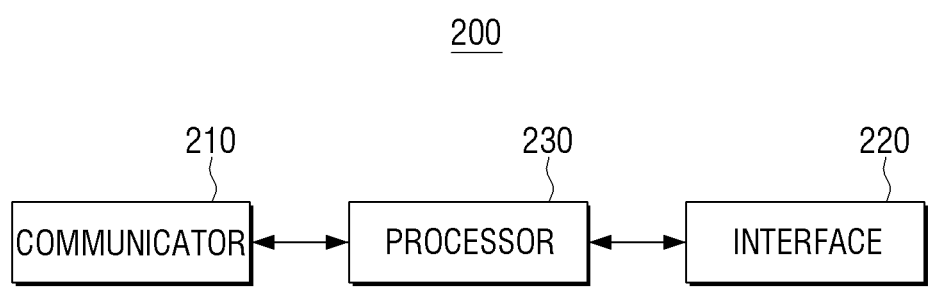
FIG. 3 is a block diagram illustrating an example configuration of a display apparatus according to an example embodiment of the present disclosure.

FIG. 3 is a block diagram illustrating an example configuration of a display apparatus according to an example embodiment of the present disclosure.

Referring to FIG. 3, the display apparatus 200 may include a communicator (e.g., including communication circuitry) 210, an interface (e.g., including interface circuitry) 220, and a processor (e.g., including processing circuitry) 230.

The communicator 210 may include various communication circuitry and performs communication with the remote controller 100 including the microphone. For example, the communicator 210 may include various communication circuitry, such as, for example, and without limitation, a chip or the like for performing Bluetooth communication, and may perform communication with the remote controller 100 according to a Bluetooth communication scheme. However, it should be noted that this is only an example, and the communicator 210 may perform communication with the remote controller 100 in various ways.

In this case, the communicator 210 may receive from the remote controller 100 the audio signal received by the remote controller 100 via the microphone.

The interface 220 may include various interface circuitry and is connected to the audio output apparatus 300 and transmits the audio signal to the audio output apparatus 300. In addition, the interface 220 may be further connected to other audio output apparatuses in addition to the audio output apparatus 300.

For example, the interface 220 may be connected to the audio output apparatus 300 through, for example, and without limitation, an optical cable, an RCA cable, an AUX cable or the like, including various types of ports. However, it should be noted that this is only an example, and the interface 220 may be connected to the remote controller 100 in various ways.

In this case, the interface 220 may transmit the test tone to the audio output apparatus 300 based on the state change of the display apparatus 200.

The processor 230 may include various processing circuitry and controls an overall operation of the display apparatus 200.

The processor 230 may control the communicator 210 to perform communication with the remote controller 100. For example, the processor 230 may, for example, and without limitation, control the communicator 210 to be connected to the remote controller 100 according to the Bluetooth communication scheme, or the like.

In addition, the processor 230 may control the interface 220 to output the audio signal to the audio output apparatus 300. Here, the audio signal may be the audio signal for various contents such as a broadcast program.

Meanwhile, the processor 230 may control the display apparatus 200 to perform an operation corresponding to the user command and output the audio signal corresponding to the user command to the audio output apparatus 300 through the interface 220.

For example, if the audio output switching command for outputting the audio signal from other devices (e.g., a speaker provided in the display apparatus 200 or other audio output apparatuses connected to the display apparatus 200) is input while the processor 230 is transmitting the audio signal to the audio output apparatus 300, the processor 230 may stop transmitting the audio signal to the audio output apparatus 300 and output the test tone to the audio output apparatus 300. The processor 230 may output the audio signal through a speaker (not illustrated) provided in the display apparatus 200 or may transmit the audio signal to another audio output apparatus (not illustrated) connected to the display apparatus 200.

Accordingly, the audio output apparatus 300, which outputs the audio signal received from the display apparatus 200 in the power-off state, may stop the output of the audio signal and output the test tone. In this case, the other devices may output the audio signal received from the display apparatus 200.

Meanwhile, the processor 230 may output the test tone having the same or similar audio characteristics as or to the audio signal output from other devices to the audio output apparatus 300.

For example, the processor 230 may analyze the audio signals transmitted to other devices to determine intensity of signals for each frequency and output a signal having the same or similar intensity for at least one frequency as the test tone.

In this case, the user hears the test tone together with the audio signals for the content output from the other devices. Therefore, since the user does not easily recognize the test tone due to the audio characteristics of the test tone, it is possible to reduce interference to the content viewing.

However, it should be noted that this is only an example and the test tone signal may be implemented in various ways.

For example, the processor 230 may output the audio signal of a specific size having a predetermined time difference at a specific frequency as the test tone, output the audio signal having the specific size at the specific frequency as the test tone, or output a first audio signal having a specific size at a specific frequency and a second audio signal having a different magnitude at a frequency different from the first signal as the test tone.

Meanwhile, the processor 230 may control the communicator 210 to determine whether there is the test tone in the audio signal received from the remote controller 100 after the test tone is transmitted to the audio output apparatus 300, and transmit to the remote controller 100 the information indicating whether there is the test tone in the audio signal.

Specifically, if the test tone is detected from the audio signal received from the remote controller 100, the processor 230 may determine that a test tone exists in the received audio signal, and transmit the information indicating that the test tone exists to the remote controller 100. However, if the test tone is not detected from the audio signal received from the remote controller 100, the remote controller 230 may determine that the test tone does not exist in the received audio signal, and transmit the information indicating that no test tone exists to the remote controller 100.

Here, since the test tone is output from the audio output apparatus 300, the determination on whether there is the test tone in the audio signal received by the processor 230 may be considered as the determination on whether the audio output apparatus 300 outputs the test tone.

That is, if the processor 230 receives the audio signal received by the remote controller 100 through the microphone 120 after transmitting the test tone, the processor 230 may determine whether or not the test tone exists in the received audio signal to determine whether the audio output apparatus 300 outputs the test tone and transmit the information indicating whether the audio output apparatus 300 outputs the test tone to the remote controller 100.

Thereafter, the processor 230 may determine whether there is the test tone in the audio signal received from the remote controller 100 after transmitting the information indicating whether the test tone signal exists in the audio signal to the remote controller 100 and transmit the information indicating whether there is the test tone in the audio signal to the remote controller 100 to the remote controller 100 through the communicator 210.

That is, if the audio signal is again received from the remote controller 100, the processor 230 may determine that the test tone exists in the received audio signal, and transmit the information indicating whether there is the test tone to the remote controller 100.

As another example, if the power-off command for turning off the power of the display apparatus 200 is input while the processor 230 is transmitting the audio signal to the audio output apparatus 300, the processor 230 may turn off the power of the display apparatus 200 and transmit the test tone to the audio output apparatus 300.

Specifically, the processor 230 turns off the power of the display apparatus 200 in response to the power-off command, and may stop outputting the audio signal before the power is turned-off and transmit the test tone to the audio output apparatus 300 together with the audio signal (e.g., e.g., a specific sound effect) indicating that the power-off command is input. However, the processor 230 may transmit only the test tone to the audio output apparatus 300.

Accordingly, the audio output apparatus 300, which outputs the audio signal received from the display apparatus 200 in the power-off state, may stop outputting the audio signal that is output and output the audio signal indicating that the power-off command is input and the test tone.

Meanwhile, the processor 230 may output to the audio output apparatus 300 the test tone having the same or similar audio characteristics as or to the audio signal indicating that the power-off command is input.

For example, the processor 230 may analyze the audio signal indicating that the power-off command is input to determine intensity of signals for each frequency and output a signal having the same or similar intensity for at least one frequency as a test tone.

In this case, the user hears the test tone together with the audio signal indicating that a power-off command has been input, and therefore does not easily recognize the test tone due to the audio characteristics of the audio signal and the test tone.

However, it should be noted that this is only an example and the test tone signal may be implemented in various ways.

For example, the processor 230 may output the audio signal of a specific size having a predetermined time difference at a specific frequency as the test tone, output the audio signal having the specific size at the specific frequency as the test tone, or output a first audio signal having a specific size at a specific frequency and a second audio signal having a different magnitude at a frequency different from the first signal as the test tone.

Meanwhile, the processor 230 may turn off the power applied to the components of the display apparatus 200 if the power-off command is input. However, the processor 230 may activate the communicator 210 and the processor 230 for a preset time even if the power-off command is input.

Meanwhile, the processor 230 may control the communicator 210 to determine whether there is the test tone in the audio signal received from the remote controller 100 after transmitting the test tone to the audio output apparatus 300, and transmit to the remote controller 100 the information indicating whether there is the test tone in the audio signal.

Specifically, if the test tone is detected from the audio signal received from the remote controller 100, the processor 230 may determine that a test tone exists in the received audio signal, and transmit the information indicating that the test tone exists to the remote controller 100. However, if the test tone is not detected from the audio signal received from the remote controller 100, the remote controller 230 may determine that the test tone does not exist in the received audio signal, and transmit the information indicating that no test tone exists to the remote controller 100.

Here, since the test tone is output from the audio output apparatus 300, the determination on whether there is the test tone in the audio signal received by the processor 230 may be considered as the determination on whether the audio output apparatus 300 outputs the test tone.

That is, if the processor 230 receives the audio signal received by the remote controller 100 through the microphone 120 after the test tone is transmitted, the processor 230 may determine whether or not the test tone exists in the received audio signal to determine whether the audio output apparatus 300 outputs the test tone and transmit the information indicating whether the audio output apparatus 300 outputs the test tone to the remote controller 100.

As another example, the processor 230 may turn on the power of the display apparatus 200 and transmit the test tone to the audio output apparatus 300 if the power-on command for turning on the power of the display apparatus 200 is input.

In this case, the output source of the display apparatus 200 may be set as the audio output apparatus 300. Therefore, if it is determined that the output source is set as the audio output apparatus 300, the processor 230 may transmit the test tone to the audio output apparatus 300.

At this time, the processor 230 may transmit the test tone to the audio output apparatus 300 together with audio signals (e.g., a specific sound effect) indicating that the power-on command has been input. However, the processor 230 can transmit only the test tone to the audio output apparatus 300.

In this case, since the power of the audio output apparatus 300 is in the turned-off state, the audio output apparatus 300 may receive the signal that the display apparatus 200 transmits and output the received signal.

Meanwhile, the processor 230 may output to the audio output apparatus 300 the test tone having the same or similar audio characteristics as or to the audio signal output indicating that the power-on command is input.

For example, the processor 230 may analyze the audio signal indicating that the power-on command is input to determine intensity of signals for each frequency and output a signal having the same or similar intensity for at least one frequency as a test tone.

In this case, the user hears the test tone together with the audio signal indicating that a power-on command has been input, and therefore does not easily recognize the test tone due to the audio characteristics of the audio signal and the test tone.

However, it should be noted that this is only an example and the test tone signal may be implemented in various ways.

For example, the processor 230 may output the audio signal of a specific size having a predetermined time difference at a specific frequency as the test tone, output the audio signal having the specific size at the specific frequency as the test tone, or output a first audio signal having a specific size at a specific frequency and a second audio signal having a different magnitude at a frequency different from the first signal as the test tone.

Meanwhile, the processor 230 may control the communicator 210 to determine whether there is the test tone in the audio signal received from the remote controller 100 after transmitting the test tone to the audio output apparatus 300, and transmit to the remote controller 100 the information indicating whether there is the test tone in the audio signal.

Specifically, if the test tone is detected from the audio signal received from the remote controller 100, the processor 230 may determine that a test tone exists in the received audio signal, and transmit the information indicating that the test tone exists to the remote controller 100. However, if the test tone is not detected from the audio signal received from the remote controller 100, the processor 230 may determine that the test tone does not exist in the received audio signal, and transmit the information indicating that no test tone exists to the remote controller 100.

Here, since the test tone is transmitted to the audio output apparatus 300 and is output or is not output based on the power state of the audio output apparatus 300, determining by the processor 230 whether there is the test tone in the received audio signal may means determining whether or not the audio output apparatus 300 is outputting the test tone.

That is, if receiving the audio signal received by the remote controller 100 through the microphone 120 after the test tone is transmitted, the processor 230 may determine whether or not the test tone exists in the received audio signal to determine whether the audio output apparatus 300 outputs the test tone and transmit the information indicating whether the audio output apparatus 300 outputs the test tone to the remote controller 100.

Meanwhile, the above example describes that the power-on command is input to the display apparatus 200, which is only an example. That is, even if the power of the audio output apparatus 300 is in the turned-off state and the audio output switching command for outputting the audio signal through the audio output apparatus 300 is input to the display apparatus 200 that outputs the audio signal through other devices, the processor 230 may turn on the power of the audio output apparatus 300 by the above-mentioned process.

Meanwhile, in the above-mentioned example, the remote controller 100 is set according to the code set capable of controlling the audio output apparatus 300 to control the audio output apparatus 300.

In this case, the code set may be stored in the remote controller 100 at the time of manufacturing, or then may be downloaded from an external server (not illustrated) or the like and stored in the remote controller 100.

In addition, the remote controller 100 may be provided with the code set capable of controlling the audio output apparatus 300 from the display apparatus 200, which will be described in more detail below.

The operation performed by the display apparatus 200 will be described in greater detail with reference to FIG. 3.

In this case, the display apparatus 200 may further include a storage (not illustrated) for storing a code set.

The storage (not illustrated) stores a plurality of code sets. Here, the code set may include various information on the control signal for controlling the audio output apparatus.

For example, the code set may include information on which format a control signal capable of controlling an audio output apparatus of a specific model manufactured by a specific manufacturer corresponds to and information on the number of bits of the custom codes and the key codes, a high level and low level holding time of each bit or the like in the corresponding format.

That is, since the format, the custom code, and the key code, or the like of the control signal for controlling the audio output apparatus may be different depending on at least one of manufacturers and models of the audio output apparatus, the storage (not illustrated) may pre-store the plurality of code sets for the audio output apparatus of various models for each manufacturer.

To this end, the storage (not illustrated) may be implemented as various storage media such as a hard disk, a nonvolatile memory, and a volatile memory.

The processor 230 may transmit the test tone to the audio output apparatus 300 and output the audio signal for contents such as a broadcast program to other devices. Here, other devices may be the speaker provided in the display apparatus 200 or other audio output apparatuses connected to the display apparatus 200.

Accordingly, the audio output apparatus 300, which is in the power-off state, may output the test tone received from the display apparatus 200.

In this case, the test tone is an audio signal having a frequency band of an audible region, and may have the same or similar audio characteristics as or to those of the audio signals output from the other devices.

In this case, the user hears the test tone together with the audio signals for the content output from the other devices. Therefore, since the user does not easily recognize the test tone due to the audio characteristics of the test tone, it is possible to reduce interference to the content viewing.

However, it should be noted that this is only an example and the test tone signal may be implemented in various ways.

For example, the processor 230 may output the audio signal of a specific size having a predetermined time difference at a specific frequency as the test tone, output the audio signal having the specific size at the specific frequency as the test tone, or output a first audio signal having a specific size at a specific frequency and a second audio signal having a different magnitude at a frequency different from the first signal as the test tone.

Meanwhile, the processor 230 may control the communicator 120 to transmit one of the plurality of code sets to the remote controller 100 while the audio output apparatus 300 outputs the test tone.

In this case, if the code set is received from the display apparatus 200, the remote controller 100 may transmit the mute signal based on the received code set to the audio output apparatus 300.

For example, the remote controller 100 may generate a signal including the key code corresponding to the custom code and the mute function based on the received code set, and transmit the generated signal to the audio output apparatus 300.

Accordingly, the audio output apparatus 300 may determine whether the signal received from the remote controller 100 is a signal capable of controlling itself according to the custom code depending on the format of the control signal, and if the control signal received from the remote controller 100 corresponds to a signal capable of controlling itself, stop outputting the audio signal according to the key code corresponding to the mute function. That is, the audio output apparatus 300 may stop outputting the test tone if the received signal is the mute signal capable of controlling itself.

However, if the signal received from the remote controller 100 does not correspond to the signal capable of controlling itself, the audio output apparatus 300 continuously outputs the test tone without performing the separate operation.

Thereafter, if the audio signal by the remote controller 100 through the microphone 120 is received from the remote controller 100, the processor 230 may determine whether the test tone is included in the received signal to determine whether the code set transmitted to the remote controller 100 is the code set capable of controlling the audio output apparatus 300.

Specifically, the remote controller 100 may receive the audio signal through the microphone 120 after transmitting the mute signal based on the code set to the audio output apparatus 300.

In this case, if the audio output apparatus 300 stops outputting the test tone according to the mute signal received from the remote controller 100, the test tone output from the audio output apparatus 300 is not included in the audio signal received through the microphone 120. However, if the audio output apparatus 300 does not stop outputting the test tone, the test tone output from the audio output apparatus 300 may be included in the audio signal received through the microphone 120.

Accordingly, after the processor 230 transmits the code set to the remote controller 100, the processor 230 may determine whether the audio output apparatus 300 outputs the audio signal based on whether there is the test tone in the audio signal received from the remote controller 100.

That is, if the test tone is detected from the audio signal received from the remote controller 100, the processor 230 may determine that the test tone output from the audio output apparatus 300 exists in the audio signal received from the remote controller 100, such that it may determine that the audio output apparatus 300 is outputting the test tone.

However, if the test tone is not detected from the audio signal received from the remote controller 100, the processor 230 may determine that the test tone output from the audio output apparatus 300 does not exist in the audio signal received from the remote controller 100, such that it may determine that the audio output apparatus 300 is not outputting the test tone. As described above, the use of the test tone is to distinguish the audio signal output from the audio output apparatus 300 from the audio signal due to the surrounding noise in that there may be the audio signal due to the surrounding noise when the remote controller 100 receives the audio signal generated from the surroundings through microphone 120.

Meanwhile, if it is determined that the audio output apparatus 300 does not output the audio signal, the processor 230 may determine whether the code set transmitted to the remote controller 100 is the code set capable of controlling the audio output apparatus 300.

In this case, the processor 230 may control the communicator 210 to transmit to the remote controller 100 the control command which allows the remote controller 100 to be set according to the received code set.

The processor 230 no longer transmits the test tone signal to the audio output apparatus 300 in that the code set capable of controlling the audio output apparatus 300 is detected.

However, the processor 230 may control the communicator 210 to transmit the other of the plurality of code sets to the remote controller 100 if it is determined that the audio output apparatus 300 is outputting the audio signal.

In this case, if the remote controller 100 receives a different code set from the display apparatus 200, the remote controller 100 may generate the mute signal based on the received different code set and transmit the generated mute signal to the audio output apparatus 300.

The remote controller 100 may collect the audio signal through the microphone 120 after transmitting the mute signal based on the different code set to the audio output apparatus 300 and transmit the collected audio signal to the display apparatus 200.

Meanwhile, if the remote controller 100 receives the audio signal received from the remote controller 100 through the microphone 120, the processor 230 may determine whether the audio output apparatus 300 outputs the audio signal based on the received audio signal to determine whether the different code set transmitted to the remote controller 100 is the code set capable of controlling the audio output apparatus 300.

That is, the processor 230 may determine whether the test tone output from the audio output apparatus 300 exists in the audio signal received from the remote controller 100, and determine the output state of the audio output apparatus 300 depending on whether there is the test tone.

Therefore, if it is determined that the audio output apparatus 300 does not output the audio signal, the processor 230 determines whether the different code set transmitted to the remote controller 100 is the code set capable of controlling the audio output apparatus 300.

In this case, the processor 230 may control the communicator 210 to transmit to the remote controller 100 the control command which allows the remote controller 100 to be set according to the received different code set.

The processor 230 no longer transmits the test tone signal to the audio output apparatus 300 in that the code set capable of controlling the audio output apparatus 300 is detected.

However, the processor 230 may control the communicator 210 to transmit the other of the plurality of code sets to the remote controller 100 if it is determined that the audio output apparatus 300 is outputting the audio signal.

As a result, the processor 230 may repeat the above-described process to detect the code set capable of controlling the audio output apparatus 300 and set the remote controller 100 with the code set capable of controlling the audio output apparatus 300.

Hereinafter, the operation performed by the remote controller 100 will be described with reference to FIG. 2.

If the code set is received from the display apparatus 200, the processor 140 may control the transmitter 110 to transmit the mute signal based on the code set to the audio output apparatus 300.

For example, the processor 140 may generate the signal including the custom code and the key code corresponding to the mute function with the format used in an audio output apparatus of a specific model by a particular manufacturer, based on the code set received from the display apparatus 200 and transmit the generated control signal to the audio output apparatus 300 through the transmitter 110.

Meanwhile, the processor 140 may control the communicator 130 to transmit the audio signal received through the microphone 120 to the display apparatus 200 after transmitting the mute signal based on the code set to the audio output apparatus 300.

Thereafter, if the processor 140 receives the control command for setting the remote controller 100 according to the code set, the processor 140 may perform a control to set the remote controller 100 according to the code set.

Therefore, if the button provided on the remote controller 100 is selected, the processor 140 may generate the signal including the custom code and the key code allocated to the selected button with a format used in an audio output apparatus of a specific model by a particular manufacturer corresponding to the mute function based on the code set, and transmit the generated control signal to the audio output apparatus 300 through the communicator 130.

However, if the processor 140 receives a different code set from the display apparatus 200 after transmitting the mute signal to the audio output apparatus 300, the processor 140 may control the transmitter 110 to transmit a mute signal based on the different code set to the audio output apparatus 300.

The processor 140 may control the communicator 110 to transmit the audio signal received through the microphone 120 to the display apparatus 200 after transmitting the mute signal based on the different code set to the audio output apparatus 300.

Thereafter, if receiving the control command for setting the remote controller 100 according to the different code set from the display apparatus 200, the processor 140 may perform a control to set the remote controller 100 according to the different code set.

In this way, the processor 140 may set the remote controller 100 to control the audio output apparatus 300 by repeating the above-described process until receiving a control command to be set according to the code set.

On the other hand, the above-mentioned example describes that after transmitting one of the plurality of code sets to the remote controller 100 the display apparatus 200 receives the audio signal from the remote controller 100, and determines the audio output state of the audio output apparatus 300 based on the received audio signal.

However, this is only an example, and the remote controller 100 may receive the audio signal through the microphone 120 before receiving the code set from the display apparatus 200 and transmit the received audio signal to the display apparatus 200.

In this case, after the audio signal is received from the remote controller 100, the display apparatus 200 may transmit one of the plurality of code sets to the remote controller 100.

Specifically, if the audio signal is received from the remote controller 100, the display apparatus may determine whether the test tone is exist in the audio signal received from the remote controller 100 and transmit one of the plurality of code sets to the remote controller 100 if it is determined that the test tone exists.

In this way, the display apparatus 200 may transmit the code set to the remote controller 100 after determining that the audio output apparatus 300 is in the state of outputting the audio signal.

Meanwhile, the above-mentioned example describes that the display apparatus 200 determines the output state of the audio output apparatus 300 based on the audio signal received from the remote controller 100, which is only an example.

That is, the remote controller 100 does not transmit the audio signal received through the microphone 120 to the display apparatus 200, and may determine the output state of the audio output apparatus 300 based on the audio signal received through the microphone 120.

Specifically, if the code set is received from the display apparatus 200, the processor 140 may control the transmitter 110 to transmit the mute signal based on the code set to the audio output apparatus 300.

Thereafter, after transmitting the mute signal based on the code set to the audio output apparatus 300, the processor 140 determines whether the test tone output from the audio output apparatus 300 exists in the audio signal received through the microphone 120 to determine whether the audio output apparatus 300 outputs the audio signal.

In this case, the remote controller 100 may receive the information on the test tone from the display apparatus 200.

Specifically, when the test tone is detected from the audio signal received through the microphone 120, the processor 140 may determine that the audio output apparatus 300 is outputting the audio signal.

However, if the test tone is not detected from the audio signal received through the microphone 120, the processor 140 may determine that the audio output apparatus 300 does not output the audio signal.

Meanwhile, if it is determined that the audio output apparatus 300 does not output the audio signal, the processor 140 may determine whether the code set received from the display apparatus 200 is the code set capable of controlling the audio output apparatus 300.

In this case, the processor 140 sets the remote controller 100 according to the code set received from the display apparatus 200, and transmits the information indicating that the code set is set as the code set capable for controlling the audio output apparatus 300 to the display apparatus 200 through the communicator 130.

Accordingly, the processor 230 may determine that the setting of the remote controller 100 is completed, and may no longer transmit the code set to the remote controller 100. The processor 230 no longer transmits the test tone signal to the audio output apparatus 300 in that the code set capable of controlling the audio output apparatus 300 is detected.

Meanwhile, if it is determined that the audio output apparatus 300 is outputting the audio signal, the processor 140 may request a transmission of the different code set to the display apparatus 200.

Therefore, if the request for the transmission of the different code set from the remote controller 100 is received, the processor 140 may transmit different code sets among the plurality of code sets to the remote controller 100 through the communicator 210.

Meanwhile, if the different code set is received from the display apparatus 200, the processor 140 may control the transmitter 110 to generate the mute signal based on the received code set and transmit the generated mute signal to the audio output apparatus 300.

Thereafter, after transmitting the mute signal based on the different code set to the audio output apparatus 300, the processor 140 may determine whether the test tone output from the audio output apparatus 300 exists in the audio signal received through the microphone 120 to determine whether the different code set corresponds to the code set capable of controlling the audio output apparatus 300.

In this way, the processor 140 repeats the above-mentioned process until it detects the code set capable of controlling the audio output apparatus 300 to set the remote controller 100 to control the audio output apparatus 300.

Meanwhile, the above examples describes that the plurality of code sets are pre-stored in the display apparatus 200, which is only an example.

That is, the remote controller 100 may store the plurality of code sets, and may transmit the mute signal based on the code set to the audio output apparatus 300 according to the control command received from the display apparatus 200.

Specifically, the processor 230 may transmit the control command for transmitting the mute signal to the remote controller 100 through the communicator 210.

In this case, the processor 140 may generate the mute signal based on one of the plurality of code sets and transmit the mute signal to the audio output apparatus 300, according to the control command received from the display apparatus 200, and determine the code set capable of controlling the audio output apparatus 300 according to whether the audio output apparatus 300 stops outputting the test tone.

On the other hand, if a plurality of code sets are pre-stored in the remote controller 100, the remote controller 100 determines whether the audio output apparatus 300 outputs the audio signal even if no control command is received from the display apparatus 200 to determine the code set capable of controlling the audio output apparatus 300.

Specifically, the display apparatus 200 transmits the test tone to the audio output apparatus 300, and the audio output apparatus 300 outputs the test tone received from the display apparatus 200.

In this case, the processor 140 may transmit the mute signal based on one of the plurality of code sets to the audio output apparatus 300 if the test tone exists in the audio signal received through the microphone 120.

After transmitting transmit the mute signal to the audio output apparatus 300, the processor 140 may receive the audio signal through the microphone 120 and determine whether the test tone output from the audio output apparatus 300 exists in the audio signal received through the microphone 120 to determine whether the code set used to transmit the mute signal corresponds to the code set capable of controlling the audio output apparatus 300.

That is, the processor 140 may determine whether or not the code set used to transmit the mute signal is a code capable of controlling the audio output apparatus 300, based on whether the test tone signal exists in the audio signal received through the microphone 120. In this case, the information on the test tone may be provided from the display apparatus 200.

Specifically, when the test tone is detected from the audio signal collected through the microphone 120, the processor 230 may determine that the audio output apparatus 300 is outputting the audio signal. However, if the test tone is not detected from the audio signal collected through the microphone 120, the processor 230 may determine that the audio output apparatus 300 does not output the audio signal.

Meanwhile, if it is determined that the audio output apparatus 300 does not output the audio signal, the processor 230 may determine whether the code set used to transmit the mute signal corresponds to the code set capable of controlling the audio output apparatus 300 and set the remote controller 100 based on the determined code set. The processor 230 may transmit a message indicating that the code set capable of controlling the audio output apparatus 300 is set to the display apparatus 200 through the communicator 220.

Therefore, the remote controller 100 may control the audio output apparatus 300.

However, if it is determined that the audio output apparatus 300 does not output the audio signal, the processor 230 may transmit the mute signal based on the different code set to the audio output apparatus 300.

After transmitting the mute signal based on the different code set to the audio output apparatus 300, the processor 230 may determine whether the test tone output from the audio output apparatus 300 exists in the audio signal received through the microphone 120 to determine whether the different code set corresponds to the code set capable of controlling the audio output apparatus 300.

In this way, the processor 230 repeats the above-mentioned process until it detects the code set capable of controlling the audio output apparatus 300 to set the remote controller 100 to control the audio output apparatus 300.

Figure 4:
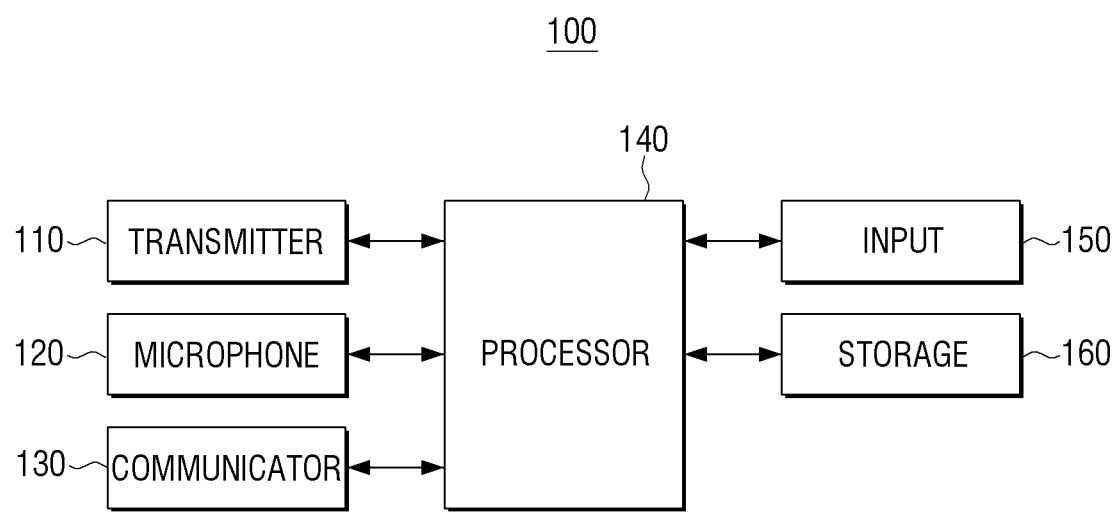
FIG. 4 is a block diagram illustrating an example configuration of a remote controller according to an example embodiment of the present disclosure.

FIG. 4 is a block diagram illustrating an example configuration of a remote controller according to an example embodiment of the present disclosure.

Referring to FIG. 4, the remote controller 100 includes the transmitter 110, the microphone 120, the communicator (e.g., including communication circuitry) 130, the processor (e.g., including processing circuitry) 140, the input (e.g., including input circuitry) 150, and the storage 160 (or a memory), and the operation of the components may be controlled by the processor 140. However, the configuration illustrated in FIG. 4 is only an example embodiment, and new components may be added according to the implementation example, and at least one component may be deleted.

Meanwhile, the transmitter 110, the microphone 120, the communicator 130, and the processor 140 illustrated in FIG. 4 have been described in detail with reference to FIG. 2, and a detailed description thereof will not be repeated here.

The processor 140 may include various processing circuitry and drive, for example, an operating system or an application program to control a plurality of hardware or software components connected to the processor 140 and may perform various data processing and operations. In addition, the processor 140 may load commands or data received from at least one of other components into a volatile memory and process the commands, and store various data in a non-volatile memory.

For this purpose, the processor 140 may include various processing circuitry, such as, for example, and without limitation, one or more of a dedicated processor (e.g., embedded processor) for performing the corresponding operations or a generic-purpose processor (e.g., CPU or application processor) that may perform the corresponding operations by executing one or more software program stored in a memory device, or the like.

The input 150 may include various input circuitry and receives various user commands. For example, the input 150 may be a component that receives user commands (e.g., power on/off, channel control, volume control, or the like) for controlling the audio output apparatus 300, and may include various input circuitry, such as, for example, and without limitation, a button (not illustrated) or a touch pad (not illustrated), or the like. Meanwhile, the processor 140 may perform a function corresponding to the user command input from the input 150.

The storage 160 may store commands or data that are received from the processor 140 or other components (e.g., transmitter 110, microphone 120, communicator 130, input 150, or the like) or generated from the processor 140 or other components.

Further, the storage 160 may include programming modules such as a kernel, middleware, an application programming interface (API), and an application. Each of the programming modules as described above may be configured of software, firmware, hardware, or a combination of at least two thereof.

Meanwhile, the storage 160 may store the remote control information corresponding to the remote controller 100. Here, the remote control information may include, for example, and without limitation, a model name, a unique device ID, a memory remaining quantity, whether there is an object data, a Bluetooth version, or a Bluetooth profile, or the like.

In addition, the storage 160 may store the information on the code set capable of controlling the audio output apparatus 300.

Accordingly, if the user command is input through the input 150, the processor 140 may transmit a signal (or control signal) for performing an operation corresponding to a user command based on the code set information to the audio output apparatus 300 or transmit a signal to the audio output apparatus 300 to turn off or on the power of the audio output apparatus 300 depending on whether the audio output apparatus 300 outputs the test tone.

Meanwhile, the storage 160 may store the information on the code set capable of controlling the display apparatus 200, and the input 150 may receive the user command for controlling the display apparatus 200.

In this case, if the user command is input through the input 150, the processor 140 may transmit to the display apparatus 200 the control signal for performing the operation corresponding to the user command based on the code set information.

Figure 5:
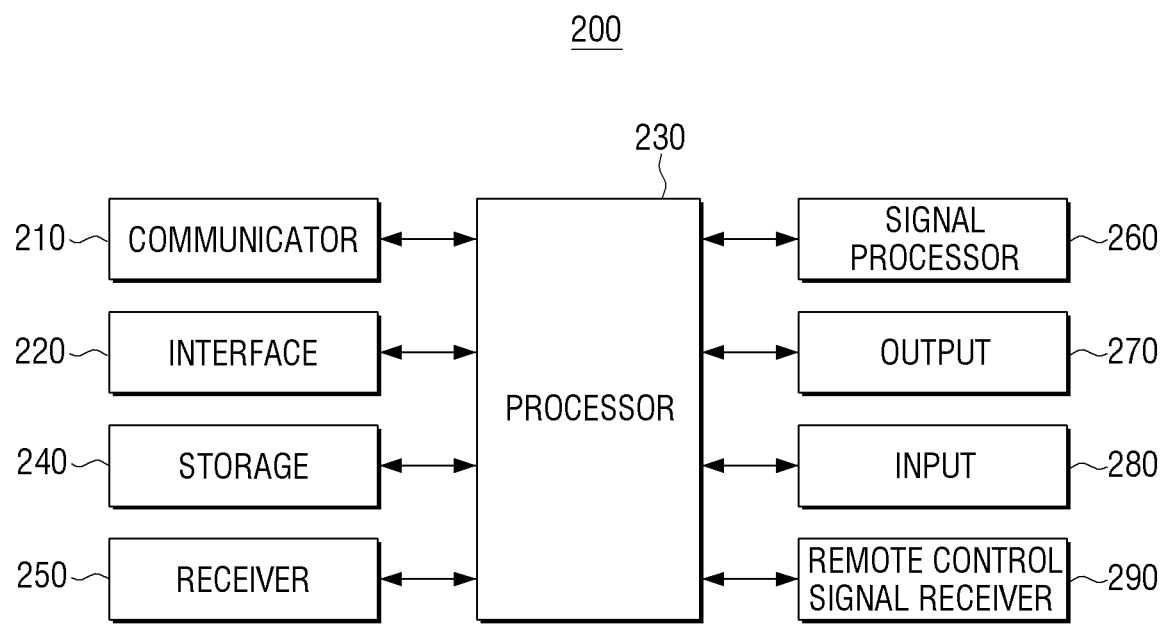
FIG. 5 is a block diagram illustrating an example configuration of the display apparatus according to an example embodiment of the present disclosure.

FIG. 5 is a block diagram illustrating an example configuration of the display apparatus according to an example embodiment of the present disclosure.

Referring to FIG. 5, the display apparatus 200 includes a communicator (e.g., including communication circuitry) 210, an interface (e.g., including interface circuitry) 220, a processor (e.g., including processing circuitry) 230, a storage 240, a receiver 250, a signal processor (e.g., including processing circuitry) 260, an output (e.g., including output circuitry) 270, an input (e.g., including input circuitry) 280 and a remote control signal receiver 290, and the operation of the components may be controlled by the processor 230. However, the configuration illustrated in FIG. 5 is only an example embodiment, and new components may be added according to the implementation example, and at least one component may be deleted.

Meanwhile, the transmitter 210, the interface 220, and the processor 230 illustrated in FIG. 5 have been described in detail with reference to FIG. 3, and a detailed description thereof will not be repeated here.

The processor 230 may include various processing circuitry and drive, for example, an operating system or an application program to control a plurality of hardware or software components connected to the processor 230 and may perform various data processing and operations. In addition, the processor 230 may load commands or data received from at least one of other components into a volatile memory and process the commands, or data and store various data in a non-volatile memory.

For this purpose, the processor 230 may include various processing circuitry, such as, for example, and without limitation, one or more of a dedicated processor (e.g., embedded processor) for performing the corresponding operations or a generic-purpose processor (e.g., CPU or application processor) that may perform the corresponding operations by executing one or more software program stored in a memory device, or the like.

The storage 240 may store commands or data that are received from the processor 220 or other components (e.g., communicator 210, interface 220, memory 240, receiver 250, signal processor 260, output 270, input 280, and remote control signal receiver 290, or the like) or generated from the processor 140 or other components.

Further, the memory 240 may include programming modules such as a kernel, middleware, an application programming interface (API), and an application. Each of the programming modules as described above may be configured of software, firmware, hardware, or a combination of at least two thereof.

The receiver 250 may include various circuitry to receive broadcasting content (or a broadcast signal). The broadcasting content may include a video signal and an audio signal, and the receiver 250 may receive broadcasting content from various sources such as terrestrial broadcasting, cable broadcasting, satellite broadcasting, and internet broadcasting.

For example, the receiver 250 may include various circuitry, such as, for example, and without limitation, a tuner (not illustrated), a demodulator (not illustrated), and an equalizer (not illustrated), or the like, in order to receive, for example, broadcasting content transmitted from a broadcasting station.

The signal processor 260 may include various circuitry that performs signal processing on the content received through the receiver 250 or the interface 220. Specifically, the signal processor 260 may perform operations such as decoding, scaling, and frame rate conversion on the video signal constituting the content to perform signal processing in a form that can be output from a display (not illustrated) of the output 270. In addition, the signal processor 260 may perform the signal processing of the decoding or the like on the audio signal constituting the content to perform signal processing in a form that can be output from an audio output (not illustrated) of the output 270.

The output 270 may include various output circuitry, such as, for example, and without limitation, a display (not illustrated), or the like, for displaying the video signal output from the signal processor 260 and an audio output (not illustrated) for outputting the audio signal output from the signal processor 260, or the like.

In this case, the display (not illustrated) may include various display types, such as, for example, and without limitation, a liquid crystal display (LCD), an organic light emitting diode (OLED) display or the like, and the audio output (not illustrated) may include, for example, and without limitation, a speaker (not illustrated) or an external output terminal (not illustrated), or the like.

The input 280 may include various input circuitry that receives various user commands. For example, the input 280 may receive a user command for performing channel change, volume adjustment, audio output switching, and the like, and the processor 140 may change the channel or adjust the volume according to the input user command.

To this end, the input 180 may include, for example, and without limitation, an input panel. The input panel may include various input circuitry, such as, for example, and without limitation, a key pad type or a touch pad type having a touch pad or various function keys, numeric keys, special keys, and character keys, or the like.

The remote control signal receiver 290 may include various circuitry that receives a control signal transmitted from a remote control (not illustrated). Here, the remote control (not illustrated) may be the remote controller 100 or a separate remote control.

In this case, the remote control signal receiver 290 may, for example, and without limitation, receive various control signals of an IR type. For example, the remote control signal receiver 290 may receive the control signal for performing the channel change, the volume control, and the like, and the processor 230 may change the channel of the display apparatus 200 or adjust the volume according to the received control signal.

Figure 6:
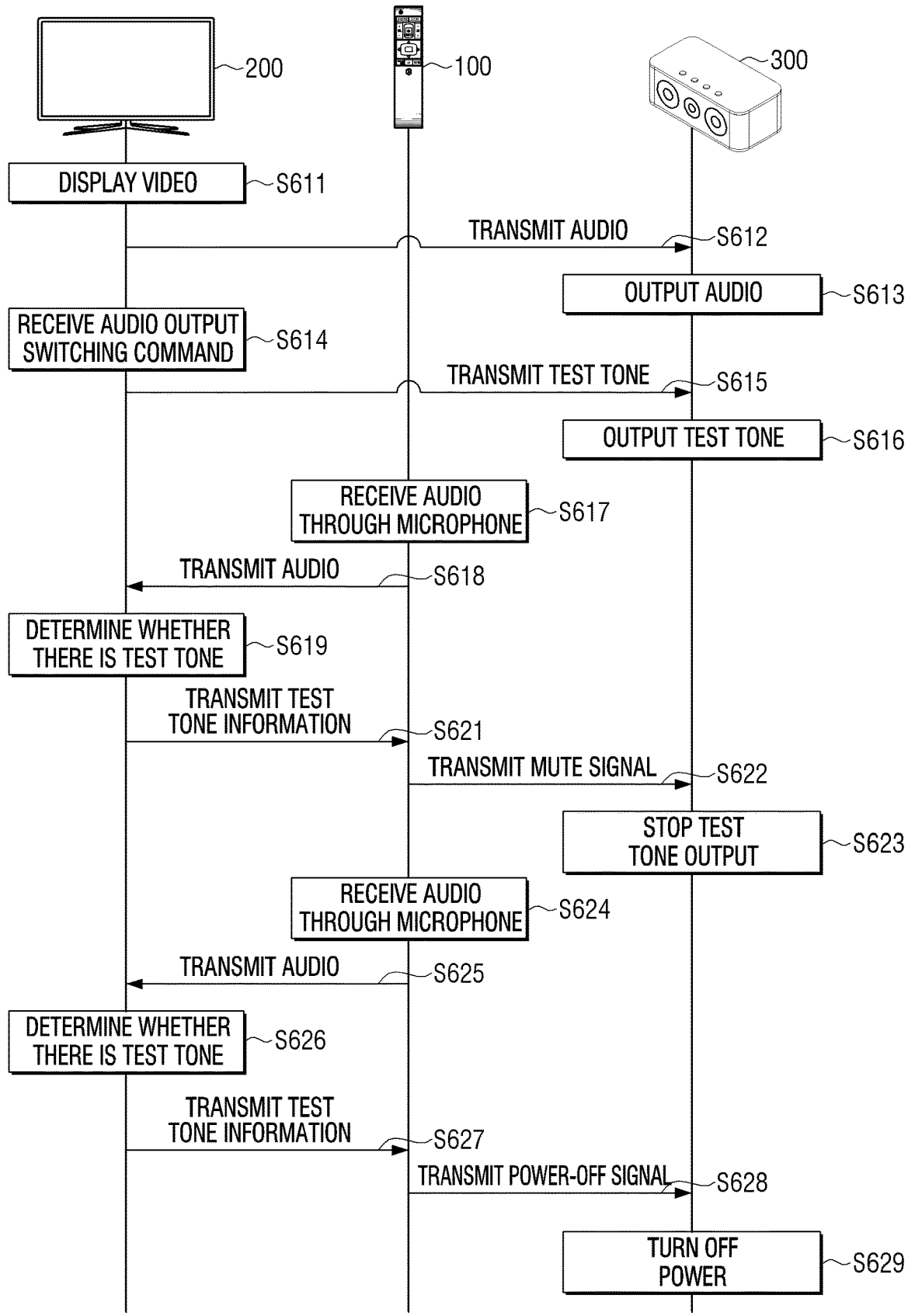
FIGS. 6, 7 and 8 are sequence diagrams illustrating example methods of controlling a power supply according to an example embodiment of the present disclosure.

FIG. 6 is a sequence diagram illustrating an example method of controlling a power of an audio output apparatus according to an example embodiment of the present disclosure.

Both the display apparatus 200 and the audio output apparatus 300 output video and audio for each content in the power-on state.

For example, the display apparatus 200 displays the video for the content (S611), and transmits the audio for the content to the audio output apparatus 300 connected to the display apparatus 200 (S612). In this case, the audio output apparatus 300 outputs the audio received from the display apparatus 200 (S613).

Thereafter, the display apparatus 200 receives an audio output switching command (S614).

Accordingly, the display apparatus 200 displays the video, but stops transmitting the audio to the audio output apparatus 300 and transmits the audio to other devices (for example, speaker provided in the display apparatus 200 or another audio output apparatus connected to the display apparatus 200).

At this time, the display apparatus 200 may transmit the test tone to the audio output apparatus 300 (S615). Accordingly, the audio output apparatus 300 outputs the test tone (S616).

Thereafter, the remote controller 100 receives audio generated from the surroundings through the microphone (S617). The remote controller 100 transmits the audio received through the microphone to the display apparatus 200 (S618).

The display apparatus 200 determines whether there is the test tone in the audio received from the remote controller 100 (S619).

The display apparatus 200 transmits the information indicating whether there is the test tone in the audio received from the remote controller 100 to the remote controller 100 (S621).

Specifically, if the test tone is detected from the audio signal received from the remote controller 100, the display apparatus 200 may transmit the information indicating that the test tone exists to the remote controller 100. In addition, if the test tone is not detected from the audio signal received from the remote controller 100, the display apparatus 200 may transmit the information indicating that the test tone does not exist to the remote controller 100.

In this case, since the audio output apparatus 300 outputs the test tone and the audio for the content is output from the other devices, the audio received by the remote controller through the microphone includes the audio for the content and the test tone.

Therefore, if the test tone is detected from the audio signal received from the remote controller 100, the display apparatus 200 may transmit the information indicating that the test tone exists to the remote controller 100.

When the information on the test tone is received from the display apparatus 200, the remote controller 100 transmits the mute signal to the audio output apparatus 300 (S622).

Specifically, the remote controller 100 may transmit the mute signal to the audio output apparatus 300 if the information that the test tone exists in the audio received by the remote controller 100 through the microphone is received from the display apparatus 200.

Accordingly, the audio output apparatus 300 may stop the output of the test tone according to the mute signal received from the remote controller 100 (S623).

The remote controller 100 receives the audio generated from the surroundings through the microphone after transmitting the mute signal (S624). The remote controller 100 transmits the audio received through the microphone to the display apparatus 200 (S625).

The display apparatus 200 determines whether there is the test tone in the audio received from the remote controller 100 (S626).

The display apparatus 200 transmits the information indicating whether there is the test tone in the audio received from the remote controller 100 to the remote controller 100 (S627).

If the information on the test tone is received from the display apparatus 200, the remote controller 100 transmits to the audio output apparatus 300 the signal for turning off the power of the audio output apparatus 300 (S628).

Specifically, the remote controller 100 may transmit to the audio output apparatus 300 the signal for turning off the power of the audio output apparatus 300 if the information that the test tone does not exist in the audio received by the remote controller 100 through the microphone is received from the display apparatus 200.

Accordingly, if the audio output apparatus 300 receives the power-off signal from the remote controller 100, the power of the audio output apparatus 300 is turned off (S629).

Figure 7:
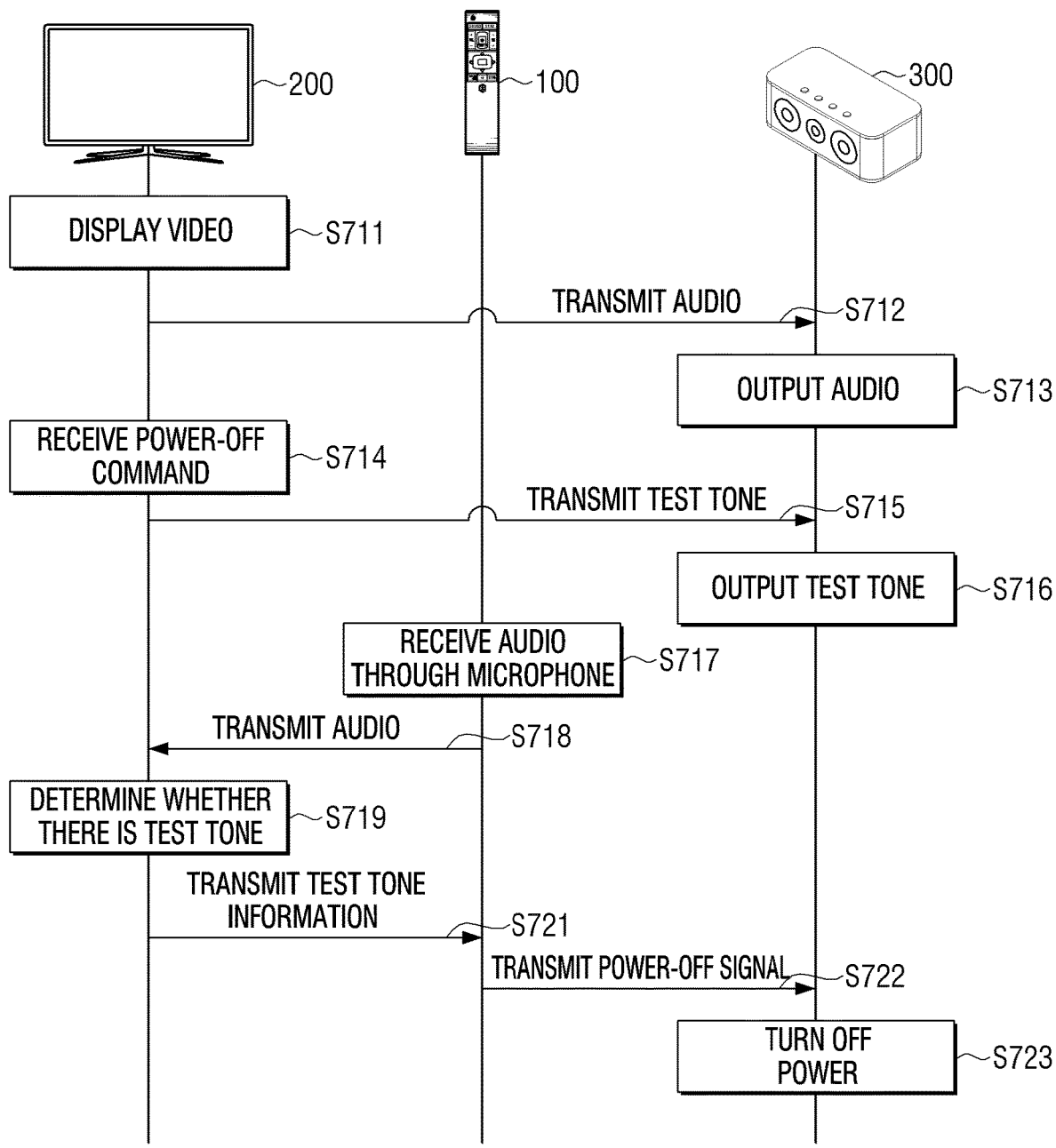

FIG. 7 is a sequence diagram illustrating an example method of controlling a power of an audio output apparatus according to an example embodiment of the present disclosure.

Both the display apparatus 200 and the audio output apparatus 300 output video and audio for each content in the power-on state.

The display apparatus 200 displays the video for the content (S711), and transmits the audio for the content to the audio output apparatus 300 connected to the display apparatus 200 (S712). In this case, the audio output apparatus 300 outputs the audio received from the display apparatus 200 (S713).

Thereafter, the display apparatus 200 receives the power-off command (S714).

In this case, the display apparatus 200 transmits the test tone to the audio output apparatus 300 (S715), and the audio output apparatus 300 outputs the test tone received from the display apparatus 200 (S716). At this time, the display apparatus 200 may transmit the audio (e.g., a specific sound effect) indicating that the power-off command is input to the audio output apparatus 300, and the audio output apparatus 300 may output the audio indicating that the test tone and the power-off command are input.

Thereafter, the remote controller 100 receives audio generated from the surroundings through the microphone (S717). The remote controller 100 transmits the audio received through the microphone to the display apparatus 200 (S718).

The display apparatus 200 determines whether there is the test tone in the audio received from the remote controller 100 (S719).

The display apparatus 200 transmits the information indicating whether there is the test tone in the audio received from the remote controller 100 to the remote controller 100 (S721).

Specifically, if the test tone is detected from the audio signal received from the remote controller 100, the display apparatus 200 may transmit the information indicating that the test tone exists to the remote controller 100. In addition, if the test tone is not detected from the audio signal received from the remote controller 100, the display apparatus 200 may transmit the information indicating that the test tone does not exist to the remote controller 100.

In this case, since the audio output apparatus 300 outputs the audio indicating that the test tone and the power-off command are input, the audio received by the remote controller through the microphone includes the audio for the content and the test tone. Therefore, if the test tone is detected from the audio signal received from the remote controller 100, the display apparatus 200 may transmit the information indicating that the test tone exists to the remote controller 100.

If the information on the test tone is received from the display apparatus 200, the remote controller 100 transmits to the audio output apparatus 300 the signal for turning off the power of the audio output apparatus 300 (S722).

Specifically, the remote controller 100 may transmit to the audio output apparatus 300 the signal for turning off the power of the audio output apparatus 300 if the information that the test tone exists in the audio received by the remote controller 100 through the microphone is received from the display apparatus 200.

Accordingly, if the audio output apparatus 300 receives the power off signal from the remote controller 100, the power of the audio output apparatus 300 may be turned off (S723).

Figure 8:
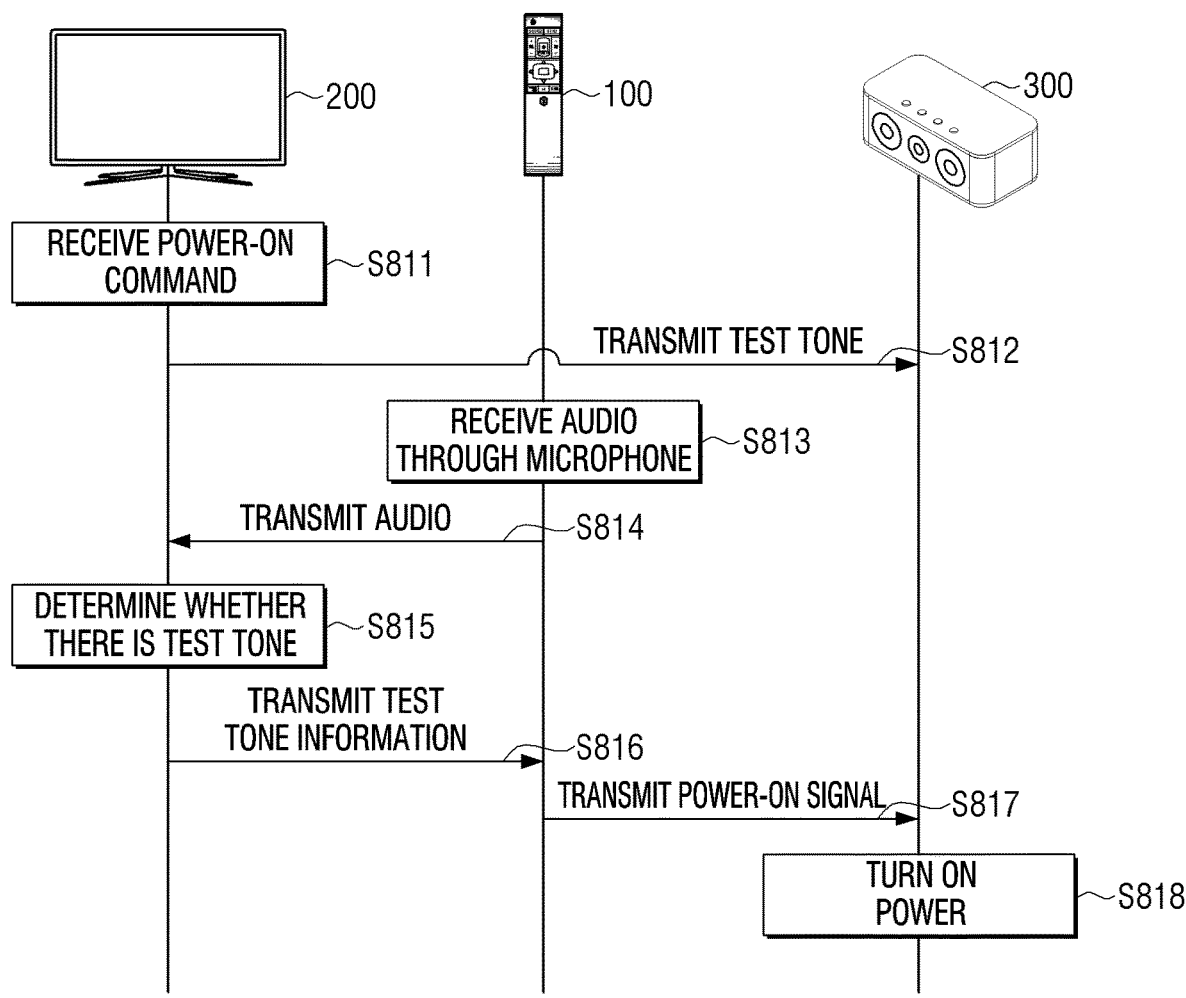

FIG. 8 is a sequence diagram illustrating an example method of controlling a power of an audio output apparatus according to an example embodiment of the present disclosure.

The power of both of the display apparatus 200 and the audio output apparatus 300 are in a turned-off state.

Thereafter, the display apparatus 200 receives a power-on command (S811), and turns on the power for the display apparatus 200.

At this time, if the output source is determined to be the audio output apparatus 300, the display apparatus 200 transmits the test tone to the audio output apparatus 300 (S812). In this case, the display apparatus 200 may transmit to the audio output apparatus 300 the audio (e.g., a specific sound effect) indicating that the power-on command has been input.

Since the power of the audio output apparatus 300 is in a turned-off state, the audio output apparatus 300 does not output the audio indicating that the test tone and the power-on command received from the display apparatus 200 are input.

Thereafter, the remote controller 100 receives audio generated from the surroundings through the microphone (S813). The remote controller 100 transmits the audio received through the microphone to the display apparatus 200 (S814).

The display apparatus 200 determines whether there is the test tone in the audio received from the remote controller 100 (S815).

The display apparatus 200 transmits the information indicating whether there is the test tone in the audio received from the remote controller 100 to the remote controller 100 (S816).

Specifically, if the test tone is detected from the audio signal received from the remote controller 100, the display apparatus 200 may transmit the information indicating that the test tone exists to the remote controller 100. In addition, if the test tone is not detected from the audio signal received from the remote controller 100, the display apparatus 200 may transmit the information indicating that the test tone does not exist to the remote controller 100.

In this case, since the audio output apparatus 300 does not output the audio indicating that the test tone and the power-on command are input, the audio received by the remote controller through the microphone does not include the test tone. Accordingly, if the test tone is not detected from the audio signal received from the remote controller 100, the display apparatus 200 may transmit the information indicating that the test tone does not exist to the remote controller 100.

If the information on the test tone received from the display apparatus 200 indicates that the test tone is not detected, the remote controller 100 transmits to the audio output apparatus 300 the signal for turning on the power of the audio output apparatus 300 (S817).

Specifically, the remote controller 100 may transmit to the audio output apparatus 300 the signal for turning on the power of the audio output apparatus 300 if the information that the test tone does not exist in the audio received by the remote controller 100 through the microphone is received from the display apparatus 200.

Accordingly, if the audio output apparatus 300 receives the power-on signal from the remote controller 100, the power of the audio output apparatus 300 may be turned on (S818).

Figure 9:
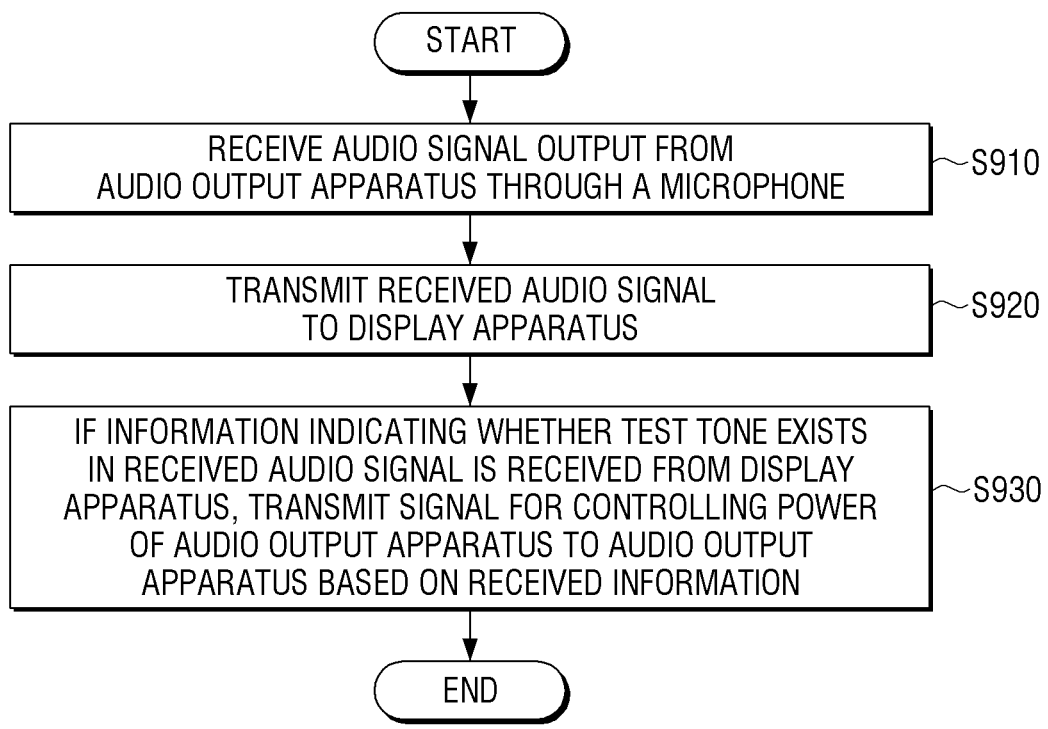
FIG. 9 is a flowchart illustrating an example method of controlling a remote controller including a microphone according to an example embodiment of the present disclosure.

FIG. 9 is a flowchart illustrating an example method of controlling a remote controller including a microphone according to an example embodiment of the present disclosure.

The audio signal output from the audio output apparatus is received through, for example, a microphone of the remote controller (S910).

The audio signal received through the microphone of the remote controller is transmitted to the display apparatus (S920).

If the information indicating whether there is the test tone in the audio signal received by the microphone is received from the display apparatus, the signal for controlling the power of the audio output apparatus based on the received information is transmitted to the audio output apparatus (S930).

If it is determined that the test tone exists in the audio signal received by the microphone based on the information received from the display apparatus, the mute signal may be transmitted to the audio output apparatus.

After the mute signal is transmitted, the audio signal received by the microphone may be transmitted to the display apparatus. In this case, in step S930, if the information indicating that no test tone exists in the audio signal received by the microphone is received from the display apparatus, the signal for turning off the power of the audio output apparatus may be transmitted to the audio output apparatus.

On the other hand, in step S930, if it is determined that the test tone exists in the audio signal received by the microphone based on the information received from the display apparatus, the signal for turning off the power of the audio output apparatus may be transmitted to the audio output apparatus.

In addition, in step S930, if it is determined that the test tone does not exist in the audio signal received by the microphone based on the information received from the display apparatus, the signal for turning on the power of the audio output apparatus may be transmitted to the audio output apparatus.

FIG. 10 is a flowchart illustrating an example method of controlling a display apparatus according to an example embodiment of the present disclosure.

The test tone is transmitted to the audio output apparatus based on the state change of the display apparatus (S1010).

The audio signal received by the remote controller through the microphone is received from the remote controller (S1020).

After the test tone is transmitted to the audio output apparatus, it is determined whether there is the test tone in the audio signal received from the remote controller, and the information indicating whether there is the test tone in the audio signal is transmitted to the remote controller (S1030).

Meanwhile, in step S1010, if the audio output switching command for outputting the audio signal from other devices while the audio signal is transmitted to the audio output apparatus, the transmission of the audio signal to the audio output apparatus may stop and the test tone may be transmitted to the audio output apparatus.

In this case, the method may further include determining that the test tone exists in the audio signal received from the remote controller and transmitting the information indicating whether there is the test tone in the audio signal to the remote controller, after the information indicating whether there is the test tone in the audio signal is transmitted to the remote controller.

Meanwhile, in step S1010, if the power-off command for turning off the power of the display apparatus is input while the audio signal is transmitted to the audio output apparatus, the power of the display apparatus may be turned off and the test tone may be transmitted to the audio output apparatus.

In step S1010, if the power-on command for turning on the power of the display apparatus is input, the power of the display apparatus may be turned on and the test tone may be transmitted to the audio output apparatus.

Meanwhile, a non-limiting example method of controlling a power of an audio output apparatus based on the test tone signal output from the audio output apparatus has been described above with reference to FIGS. 9 and 10.

A non-transitory computer readable medium in which a program sequentially performing the controlling method according to the present disclosure is stored may be provided.

The non-transitory computer readable medium is, for example, a medium that semi-permanently stores data and is readable by a device. For example, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In addition, although buses are not illustrated in the block diagrams illustrating the display apparatus and the remote controller, communication between the respective components in the display apparatus and the remote controller may be performed through the buses. In addition, the display apparatus and the remote control apparatus may further include various processing circuitry, for example, and without limitation, processors such as a dedicated processor, a CPU, a microprocessor, or the like, which execute various processes described above.

Although various example embodiments of the present disclosure have been illustrated and described hereinabove, the present disclosure is not limited to the above-mentioned specific example embodiments, but may be variously modified by those skilled in the art to which the present disclosure pertains without departing from the scope and spirit of the disclosure as disclosed in the accompanying claims. These modifications should also be understood to fall within the scope of the present disclosure.

What is claimed is:

1. A remote controller, comprising:
   a transmitter;
   a microphone;
   a communicator comprising communication circuitry; and
   a processor configured to:
      based on the microphone receiving an audio output from an audio output apparatus, control the communicator to transmit an audio signal corresponding to the received audio to a display apparatus, wherein the display apparatus transmits a test tone to the audio output apparatus based on receiving an audio output switching command, power-on command or power-off command, wherein the test tone has an intensity corresponding to an intensity of an audio signal outputted by another audio output apparatus for at least one frequency based on an audio signal transmitted from the display apparatus to the other audio output apparatus, and
      based on information indicating that the test tone is included in the received audio signal being received from the display apparatus, control the transmitter to transmit a signal for turning on or off a power of the audio output apparatus to the audio output apparatus.

2. The remote controller as claimed in claim 1, wherein the processor is configured to control the communicator to transmit a mute signal to the audio output apparatus if it is identified that the test tone exists in the audio signal received by the microphone based on the information received from the display apparatus.

3. The remote controller as claimed in claim 2, wherein the processor is configured to control the communicator to transmit the audio signal received by the microphone to the display apparatus after transmitting the mute signal, and to transmit the signal for turning on or off the power of the audio output apparatus to the audio output apparatus if the information indicating that the test tone does not exist in the audio signal received by the microphone is received from the display apparatus.

4. The remote controller as claimed in claim 1, wherein the processor is configured to control the communicator to transmit a signal for turning on or off the power of the audio output apparatus to the audio output apparatus if it is identified that the test tone exists in the audio signal received by the microphone based on the information received from the display apparatus.

5. The remote controller as claimed in claim 1,
   wherein the display apparatus transmits a test tone to the audio output apparatus based on receiving a power-on command, and
   wherein the processor is configured to control the communicator to transmit a signal for turning on the power of the audio output apparatus to the audio output apparatus if it is identified that the test tone does not exist in the audio signal received by the microphone based on the information received from the display apparatus.

6. A display apparatus, comprising:
   an interface comprising interface circuitry configured to be connected to an audio output apparatus and to transmit a test tone to the audio output apparatus based on the display apparatus receiving an audio output switching command, power-on command, or power-off command;
   a communicator comprising communication circuitry configured to perform communication with a remote controller including a microphone and to receive an audio signal received by the remote controller through the microphone from the remote controller; and
   a processor configured to identify whether a test tone exists in the audio signal received from the remote controller after the test tone is transmitted to the audio output apparatus and to control the communicator to transmit information indicating whether the test tone exists in the audio signal to the remote controller, wherein the test tone has an intensity corresponding to an intensity of an audio signal outputted by another audio output apparatus for at least one frequency based on an audio signal transmitted from the display apparatus to the other audio output apparatus,
   wherein the remote controller is configured to turn on or off a power of the audio output apparatus based on the information indicating that the test tone exists in the audio signal being received to the remote controller.

7. The display apparatus as claimed in claim 6, wherein the processor is configured to stop transmitting the audio signal to the audio output apparatus and to transmit the test tone to the audio output apparatus, based on an audio output switching command for outputting the audio signal from other devices being received while the audio signal is transmitted to the audio output apparatus.

8. The display apparatus as claimed in claim 7, wherein the processor is configured to identify whether the test tone exists in the audio signal received from the remote controller and to control the communicator to transmit information indicating whether the test tone exists in the audio signal to the remote controller, after transmitting the test tone to the audio output apparatus.

9. The display apparatus as claimed in claim 6, wherein the processor is configured to turn on or off a power of the display apparatus and to transmit the test tone to the audio output apparatus, based on a power-on or power-off command for turning off a power of the display apparatus being received while the audio signal is transmitted to the audio output apparatus.

10. The display apparatus as claimed in claim 6, wherein the processor is configured to turn on the power of the display apparatus and to transmit the test tone to the audio output apparatus, based on a power-on command for turning on the power of the display apparatus being received.

11. A method of controlling a remote controller, comprising:
receiving an audio signal output from an audio output apparatus through a microphone of the remote controller;
transmitting the audio signal received through the microphone to a display apparatus, wherein the display apparatus transmits a test tone to the audio output apparatus based on receiving an audio output switching command, power-on command, or power-off command, wherein the test tone has an intensity corresponding to an intensity of an audio signal outputted by another audio output apparatus for at least one frequency based on an audio signal transmitted from the display apparatus to the other audio output apparatus; and
transmitting a signal for turning on or off a power of the audio output apparatus to the audio output apparatus, based on information indicating that a test tone is included in the received audio signal, being received from the display apparatus.

12. The method as claimed in claim 11, further comprising:
transmitting a mute signal to the audio output apparatus if it is identified that the test tone exists in the audio signal received by the microphone based on the information received from the display apparatus.

13. The method as claimed in claim 12, further comprising:
transmitting the audio signal received by the microphone to the display apparatus, after the transmitting of the mute signal,
wherein in the transmitting, based on the information indicating that the test tone does not exist in the audio signal received by the microphone being received from the display apparatus, transmitting a signal for turning on or off the power of the audio output apparatus to the audio output apparatus.

14. The method as claimed in claim 11, wherein in the transmitting, if it is identified that the test tone exists in the audio signal received by the microphone based on the information received from the display apparatus, transmitting a signal for turning on or off the power of the audio output apparatus to the audio output apparatus.

15. The method as claimed in claim 11,
wherein the display apparatus transmits a test tone to the audio output apparatus based on receiving a power-on command, and
wherein in the transmitting, if it is identified that the test tone does not exist in the audio signal received by the microphone based on the information received from the display apparatus, transmitting a signal for turning on the power of the audio output apparatus to the audio output apparatus.

16. A method of controlling a display apparatus, comprising:
transmitting a test tone to an audio output apparatus based on the display apparatus receiving an audio-output switching command, power-on command, or power-off command;
receiving an audio signal received by a remote controller;
identifying whether a test tone exists in the audio signal received from the remote controller after the test tone is transmitted to the audio output apparatus, wherein the test tone has an intensity corresponding to an intensity of an audio signal outputted by another audio output apparatus for at least one frequency based on an audio signal transmitted from the display apparatus to the other audio output apparatus; and
transmitting information indicating whether the test tone exists in the audio signal to the remote controller,
wherein the remote controller turns on or off a power of the audio output apparatus based on the information indicating that the test tone exists in the audio signal being received by the remote controller.

17. The method as claimed in claim 16, wherein in the transmitting of the information to the audio output apparatus, the transmission of the audio signal to the audio output apparatus stops and the test tone is transmitted to the audio output apparatus, based on an audio output switching command for outputting the audio signal from other devices being input while the audio signal is transmitted to the audio output apparatus.

18. The method as claimed in claim 17, further comprising:
identifying whether the test tone exists in the audio signal received from the remote controller and transmitting information indicating whether the test tone exists in the audio signal to the remote controller, after transmitting the test tone in the audio signal to audio output apparatus.

19. The method as claimed in claim 16, wherein in the transmitting of the information to the audio output apparatus, a power of the display apparatus is turned off and the test tone is transmitted to the audio output apparatus, based on a power-off command for turning off a power of the display apparatus being input while the audio signal is transmitted to the audio output apparatus.

20. The method as claimed in claim 16, wherein in the transmitting of the information to the audio output apparatus, the power of the display apparatus is turned on and the test tone is transmitted to the audio output apparatus, based on a power-on command for turning on the power of the display apparatus being received.

* * * * *